United States Patent

[11] 3,621,218

[72] Inventor Tetsunori Nishimoto
Tokyo, Japan

[21] Appl. No. 763,286
[22] Filed Sept. 27, 1968
[45] Patented Nov. 16, 1971
[73] Assignee Hitachi, Ltd.
Tokyo-To, Japan
[32] Priority Sept. 29, 1967
[33] Japan
[31] 42/62331

[54] HIGH-SPEED DIVIDER UTILIZING CARRY SAVE ADDITIONS
4 Claims, 35 Drawing Figs.

[52] U.S. Cl. .......... 235/164
[51] Int. Cl. .......... G06f 7/52
[50] Field of Search .......... 235/164, 156

[56] References Cited

UNITED STATES PATENTS

| | | | |
|---|---|---|---|
| 3,293,418 | 12/1966 | Thornton .......... | 235/156 |
| 3,319,057 | 5/1967 | Githens, Jr. et al. .......... | 235/164 |

OTHER REFERENCES

Metze " A Class of Binary Divisions Yielding Mimimally Represented Quotients" IRE Trans. on Electronic Computers Dec. 1962 pp. 761- 764

Wallace " A Suggestion For a Fast Multiplier" IEEE Trans. on Electronic Computers Feb. 1964 pp. 14- 17

*Primary Examiner*—Eugene G. Botz
*Assistant Examiner*—David H. Malzahn
*Attorney*—Craig, Antonelli and Hill ABSTRACT: A divider is made up of a first pair of registers, a decorder, a pair of gate circuits, a carry save adder and a second pair of registers. The decorder produces a partial quotient in response to the upper parts of sum and carry signals representative of a partial remainder held in the first pair of registers. The carry save adder adds the partial remainder shifted upwards by one figure with either of divisior, zero or the complement of divisor selected by the pair of gate circuits in response to the partial quotient and produces new sum and carry signals representative of a new partial remainder to replace the previous partial remainder in the first pair of registers therewith. Thus the second pair of registers holds in succession the sequence of partial quotients produced by the decoder.

INVENTOR

TETSUNORI NISHIMOTO

BY

Craig & Antonelli

ATTORNEYS

INVENTOR

TETSUNORI NISHIMOTO

BY Craig & Antonelli

ATTORNEYS

INVENTOR
TETSUNORI NISHIMOTO

BY
Craig & Antonelli
ATTORNEYS

INVENTOR
TETSUNORI NISHIMOTO

BY Craig & Antonelli
ATTORNEYS

INVENTOR
TETSUNORI NISHIMOTO

BY Craig & Antonelli
ATTORNEYS

INVENTOR

TETSUNORI NISHIMOTO

BY

Craig & Antonelli

ATTORNEYS

INVENTOR

TETSUNORI NISHIMOTO

BY

ATTORNEYS

INVENTOR

TETSUNORI NISHIMOTO

BY Craig & Antonelli

ATTORNEYS

HIGH-SPEED DIVIDER UTILIZING CARRY SAVE ADDITIONS

BACKGROUND OF THE INVENTION

This invention relates to a high-speed divider and particularly to a divider having a carry save adder in which carries are separately stored.

Information-processing apparatus such as computers have four basic arithmetic operation faculties of addition, subtraction, multiplication and division. Of these four operations, multiplication and division are in many cases performed by repeated addition and subtraction. This naturally makes it necessary for the computers to take much time in operations when the numbers of figures to be manipulated are increased. Efforts have therefore been made to speed up the operations with multipliers of high-speed computers by permitting them to carry out parallel operations, for example multiplication of a multiplicand and a multiplier of a plurality of figures all at once. With dividers it has also been proposed to increase the speed of operation for division by calculating a partial quotient consisting of a plurality of figures in each operation thereby reducing the number of repetitive steps of addition and subtraction.

It should be noted, however, that the speed of operation for division is essentially dependent upon the operating speed of the adder which carries out the addition and subtraction. Conventional adders are constructed, as will be described later, so that a carry is propagated from a less significant figure to more significant figures until a final sum is obtained. On such adders it can occur in extreme cases that a carry from the least significant figure is propagated all the way to the most significant figure, thus extending the total operating time to a very long period and accordingly slowing down the operation of the divider that utilizes such an adder arrangement.

In order to avoid the delay of operation due to the abovesaid arrangement in which a carry is propagated to more significant figures, it has also been proposed to use a so-called carry save adder or an adder in which the carry is not propagated in succession to more significant figures but wherein each carry is held in each figure together with the sum for the particular figure. Such adders are in use for high-speed multipliers and the like. In this type of adder each sum is represented by two numerical values, say *S* and *T*, and the value and sign of the sum cannot be obtained unless the sum of *S* and *T* is further calculated by an ordinary adder as already described. Like the sum, the augend is also represented by two numerals and their sum constitutes the value of the augend. If the above carry save adder was incorporated in a divider, the operation speed could be increased. In the ordinary method of division, however, the carry save adder cannot be employed because it is necessary to see whether the sign of the partial remainder is positive or negative in order to find the ensuing partial quotient.

For example, the nonrestoring method which is a well-known method of division is, when applied to a binary operation by way of illustration, to add a divisor $d$ $(d>o)$ to a partial remainder $Ri$ if the sign of the latter is negative, or to subtract $d$ from $Ri$ if the sign is positive, and then double the excess to obtain the partial remainder $Ri+1$ for the next step. Thus, unless the sign of the partial remainder is known, it is impossible to proceed to the step that follows.

SUMMARY OF THE INVENTION

A principal object of this invention is to provide a high speed divider employing a carry save adder.

Another object of this invention is to make it possible to provide a decoder by which a partial quotient is obtained even if a sign of a partial remainder cannot be known.

According to the present invention, a divider comprises a decoder adapted to generate in succession partial quotient signals each of one figure or a plurality of figures from signals of predetermined plural figures held in the upper parts of the registers which hold two numerical values each the sum of which constitutes a partial remainder or from these signals of the predetermined plural figures and signals of predetermined plural figures held in the upper parts of the registers which hold the divisor, and a register which holds the partial quotient signals successively. The divider also comprises means to select any of the divisor, zero or the complement of the divisor as an output signal according to the values of respective figures of the partial quotient, and one or a plurality of carry save adders which use the partial remainder held by the registers and the output signal or the output signals chosen by said selecting means as input signals and obtain from these input signals sums and carries for the respective figures thereof and then have the registers hold them separately as the partial remainder for the next step. The decoder produces a partial quotient in such manner as to give a partial remainder for the next step within a predetermined range of value. It thus prevents the partial quotient from being produced in any range where there is the danger of an erroneous partial quotient being generated because the sign and value of the partial remainder are not known.

The foregoing and other objects of this invention, the features thereof, as well as the invention itself, may be more fully understood from the following description, when read together with the accompanying drawings which illustrate by way of example certain preferred embodiments of this invention.

In general, a computer performs a division by the following procedure.

By way of illustration let the dividend be $x$, the divisor be $d$, the partial remainder after the repetition by $k$ times of addition or subtraction be $y_k$, the partial remainder shifted upwards be one figure after the $k$ times of repeated operations by $y'_k$, the partial quotient be $j$, and the quotient after the $k$ times of repeated operation be $q_k$, and it is assumed that a division is performed by $r$ notation using a radix $r$. In the procedure shown below, the symbol $(A \leftarrow B)$ means that $A$ is substituted by $B$ to form $A$ anew.

Step 1. $y_o' \leftarrow x, q_o \leftarrow o, k \leftarrow o$

2. $k \leftarrow k+1$, and $j$ is determined from $y'_{K\cdot 7E\cdot 1}$ and $d$ 3. $y_k \leftarrow y'_{K\cdot 7E\cdot} 1jxd$ 4. $y'_K \leftarrow sxy_k$ 5. $gk \leftarrow rxq_{K\cdot 7E\cdot 1}j$ 6. by the value of $k$ the completion of operation is confirmed. If the operation is found incomplete, it is brought back to Step 2.

If it is desired to obtain by Step 2 $j$ as $$\left|\frac{y'_{k-1}}{d}-j\right|<\frac{1}{r}$$

(i.e., $j=a/r$ where an integer a: $|a|<r$), then $$\left|\frac{y'_k}{d}\right|<\frac{1}{r}$$

is assured by Step 3, and when it is multiplied by the radix $r$ in Step 4 and the partial remainder $y_k$ is shifted upward by one figure thus becomes $y'_k$, the relation $$\left|\frac{y'_k}{d}\right|<1$$

will be maintained. Thus, $j$ can be again selected that is $$\left|\frac{y'_k}{d}-j\right|<\frac{1}{r}$$

and the division can be carried on. It is therefore necessary to normalize the dividend and divisor so as to obtain $x/d<1$ prior to the start of division.

When the above procedure has been repeated $n$ times, the relation as represented by equation (1) holds:

$$x=r^{\cdot 7E\cdot n+1}\times q_n\times d+r^{\cdot 7E\cdot n}\times y'_n \qquad (1)$$

As can be seen from equation (1), the quotient is $r^{\cdot 7E\cdot n+1}\cdot q_n$ and the remainder is $r^{\cdot 7E\cdot n}\cdot y'_n$.

In the nonrestoring method above referred to, $j$ in the case where $r=2$ will be $j=½$ *if*

$$\frac{y'_{k-1}}{d}\geqq O \text{ or } j=-\frac{1}{2} \text{ if } \frac{y'_{k-1}}{d}<O$$

Thus if $$-1\leqq\frac{y'_{k-1}}{d}<1,\ \text{then} -\frac{1}{2}\leqq\frac{y'_{k-1}}{d}-j<\frac{1}{2}$$

whether $j$ be ½ or −½. As a result, the relation $$-1\leqq\frac{y'_{k-1}}{d}<1$$

is ensured, and only if the relation $-1\leqq x/d<1$ is initially maintained, the quotient can be calculated to a desired accuracy. Hence, the partial quotient $j$ can be given by simply discriminating the sign of the partial remainder $y_{k\cdot 7E\cdot 1}$.

Figure 1:
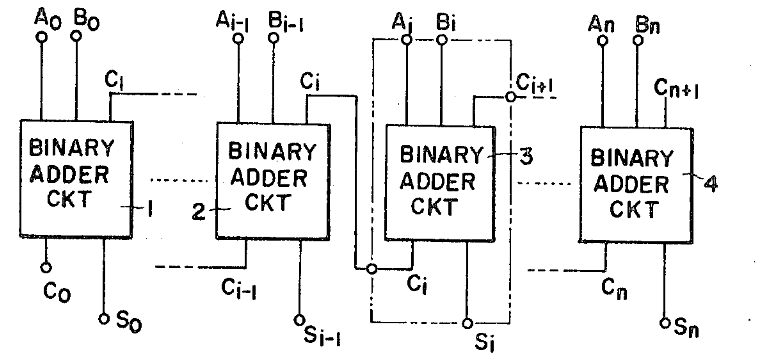
FIG. 1 PRIOR ART
FIGS. 1 and 2 are schematic diagrams illustrating the general system and the circuit configuration for one figure, respectively, of a conventional adder.

FIG. 1 shows schematically a conventional adder for use with a divider incorporating, for example, the nonrestoring method above described. In the figure, binary adder circuits for the respective figures are indicated at 1 to 4. From the augends $A_o$, , $A_{i\cdot 7E\cdot 1}$, $A_1$, , $A_n$, addends $B_o$, , $B_{i\cdot 7E\cdot 1}$, $B_i$ , $B_n$ and carries from the next lower figures $C_1$, , $C_i$, $C_{i+1}$, , $C_{n+1}$, applied to their respective input terminals, sums of the figures $S_o$, , $S_{i\cdot 7E\cdot 1}$, $S_i$, , $S_n$ and carries to the next higher figures $C_o$, ( $C_{i\cdot 7E\cdot 1}$, $C_i$, , $C_n$ are obtained at the output terminals. Therefore, in a most undesirable case, a carry may be transferred in succession from the least significant figure all the way to the most significant figure, thus taking much time before the addition is completed.

Figure 2:
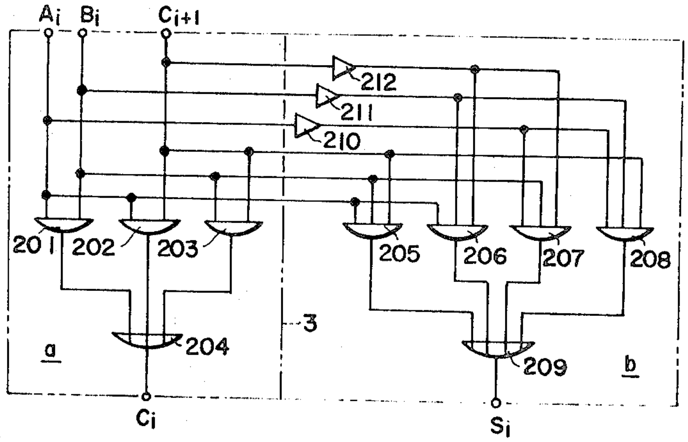
FIG. 2 PRIOR ART

FIG. 2 is a schematic view of a unit adder circuit for one figure of the adder shown in FIG. 1, for example the adder circuit 3 for the $i$th figure. It consists of a carry circuit $a$ and a sum circuit $b$. The construction of the adder circuit for the $i$th figure ($i$=0, 1, . . ., n) can be represented by a logical formula, as equation (2) below, from the augend $A_i$, addend $B_i$, carry $C_{i+i}$ from the $i$+1th figure, carry $C_1$ to the $i$−1th figure, and sum $S_i$.

$$C_i=C_{i+1}.A_i+C_{i+1}.B_i+A_i.B_i$$

$$S_i=C_{i+1}.A_i.B_i+C_{i+1}.\overline{A_i}.\overline{B_i}+\overline{C_{i+1}}.A_i.\overline{B_i}+\overline{C_{i+1}}.\overline{A_i}.B_i \quad (2)$$

In the above equation, symbol (·) represents a logical product, symbol (+) represents a logical sum, and $A_i$, $B_i$ and $C_{i+1}$ represent, respectively, the inverted signals of $A_i$, $B_i$ and $C_{i+1}$. In $a$ of FIG. 2, reference numerals 201 through 203 indicate AND circuits, which obtain logical products of different pairs of input signals $A_i$, $B_i$ and $C_{i+1}$, and the logical sum of the output signals from the AND-circuits 201 through 203 is obtained by an OR-circuit 204, so that, while at least two of the input signals $\overline{A_i}$, $\overline{B_i}$ and $\overline{C_{i+1}}$ indicate signals "1," the carry $C_i$ becomes "1" as the output signal. In FIG. 2, $b$ represents a sum circuit, in which the input signals $A_i$, $B_i$ and $C_{i+1}$ and these signals inverted by inverters 210 to 212 into $A_i$, $B_i$ and $C_{i+1}$, respectively, are combined in different groups of three signals each and the logical products of these groups are taken by AND-circuits 205 to 208, so that values of $C_{i+1}\cdot a_i\cdot B_i$, $C_{i+1}\cdot\overline{A_i}\cdot\overline{B_i}$, $\overline{C_{i+1}}A_i\cdot\overline{B_i}$, and $\overline{C_{i+1}}\cdot\overline{A_i}\cdot B_i$ are found, and further the logical sum of the output signals from the AND-circuits 205 to 208 is obtained by an OR-circuit 209, and thus the sum $S_i$ of the $i$th figure can be obtained. In the case of a subtraction, the operation can be performed with the adder by finding the subtrahend complement and adding it to the minuend.

The present invention is based on a novel method for division which, unlike the nonrestoring method above described, makes it possible to obtain an accurate partial quotient when the partial remainder is represented by two numerals and their signs and values are not known, and permits the use of the carry save adder also described above.

Figure 3:
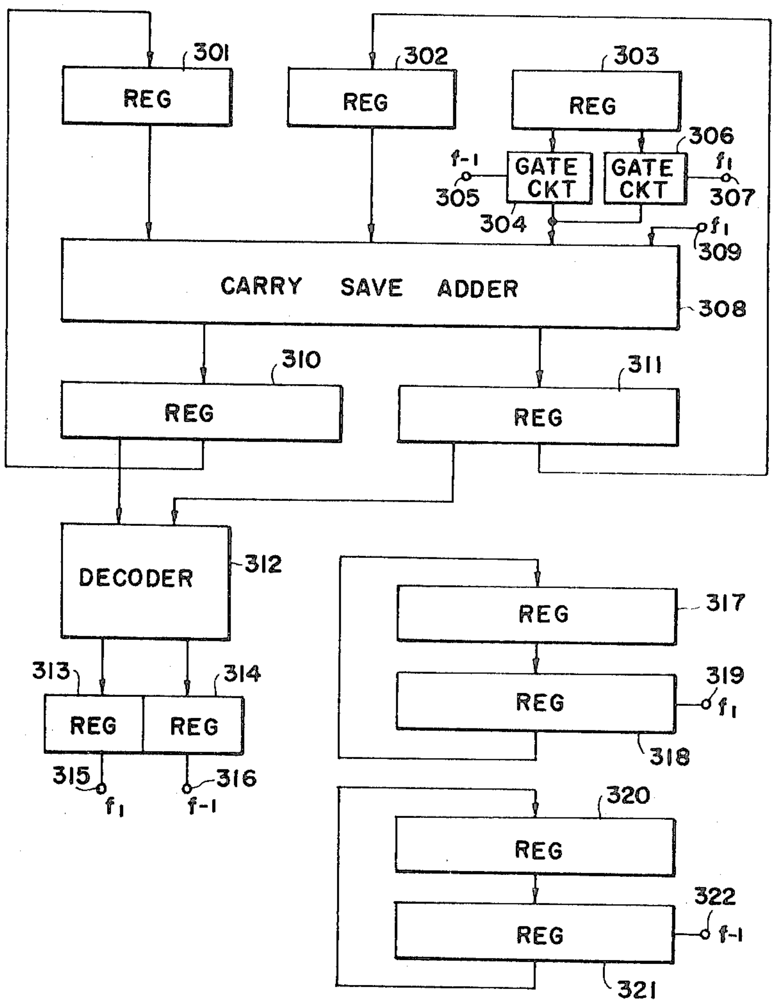
FIG. 3 is a schematic diagram showing an embodiment of the present invention.

FIG. 3 is a schematic diagram illustrating an embodiment of the present invention. The embodiment takes the form of a divider which gives a partial quotient for each binary figure. Indicated at 301 and 302 are registers, each holding therein two separate numerals constituting a partial remainder. There is incorporated another register 303, in which a significant figure is shifted to the next bit of the sign bit and a normalized divisor is set. Selecting means consisting of gate circuits are indicated at 304 and 306, which are controlled by partial quotient signals applied on control terminals 305 and 307, respectively, and the divisor or an inverted signal of the divisor is transmitted from the register 303 to a carry save adder 308. For example, if a signal $f_1$ which indicates that −1 has been given as a partial quotient is applied to the terminal 307, the signal representing the inverted divisor is transmitted therethrough. Similarly, if a signal $f_1$ which indicates that −1 has been given as a partial quotient is applied to the terminal 305, the signal representing the divisor is directly transmitted therethrough. It then follows that when the partial quotient is 0 the gate circuit 304 and 306 are closed and the divisor is not transmitted.

In the carry save adder 308, a sum part and a carry part are obtained for each figure from the partial remainder held in the registers 301 and 302 and from the divisor or inverted divisor transmitted from the register 303 through the gate circuits 304 and 306, and then the signals of such sum and carry parts are applied to and held by registers 310 and 311. At this time, if the divisor is to be subtracted from the partial remainder upon the application of $f_1$ on the control terminal 307 of said gate circuit 306, it is appreciated that mere inversion of the divisor cannot provide a complement for the divisor and accurate subtraction is not rendered possible. For this reason, a partial quotient $f_1$ indicating that +1 has been given is applied by the terminal 309 to the least significant figure of the adder, so that a complete complement of the divisor can be transmitted to the adder 308. The sum and carry held by the registers 310 and 311 are shifted upward by one figure or to a more significant figure (leftward as viewed in the diagram) as partial remainders for the next step, which are then transmitted, except for the most significant figure, to the registers 301 and 302. At the same time, the signal of plural figures which is in the more significant figures of the registers 310 and 311 is applied to a decoder 312. The decoder 312 decodes the signal to choose the partial quotient for the ensuring step. The signals of the partial quotient thereby decoded are held by registers 313 and 314, and emerge as partial quotient signals $f_1$ and $f_{\cdot 7E\cdot 1}$ at terminals 315 and 316, respectively. The partial quotient signals $f_1$ and $f_{7E'1}$ held by the registers 313 and 314 are not only applied on the control terminals 305 and 307 of gate circuits 304 and 306 and on the terminal 309 of adder 308 but also upon the input terminals 319 and 322 of registers 318 and 321. The contents of the registers 318 and 321 are transferred to the registers 317 and 320 prior to the application of new partial quotient signals on the terminals 319 and 322. The signals, when to be transferred by the registers 317 and 320 back to the registers 318 and 321, are shifted to a more significant figure (leftward as viewed in the diagram), and the new partial quotient signals $f_1$ and $f_{7E'1}$ are applied to the least significant figure.

If therefore a dividend is initially set to the register 310 and a divisor as partial remainder to the register 303, and if the registers 311, 318 and 321 are reset to zero, then the partial quotient is obtained by the decoder 312 and, under control by a suitable timing signal, the partial remainder signals are transferred from the registers 310 and 311 to the registers 301 and 302. Further, under the control by the partial quotient, the next partial quotient signals derived from the partial remainder and divisor through the carry save adder 308 are set to the registers 310 and 311. Also, the quotient held by the registers 318 and 321 are transferred by a suitable timing signal to the registers 317 and 320 and are transferred back to the registers 318 and 321, while new partial quotient signals generated by the decoder 312 are being applied to the least significant figure. Through the repetition of this procedure, the division is carried out in succession. The division is completed when a quotient of the necessary number of FIGS. has been obtained, the application of the timing signal discontinued, and the transfer of partial remainder and quotient stopped.

With this divider, the quotient and remainder are obtained as divided in two numerals each, in the pairs of registers 318, 321 and 310, 311, respectively. Accordingly, the final quotient is obtained, for example, by subtracting the value in the register 321 from that in the register 318 by means of an adder of the type described and well known to the art. The remainder is likewise obtained by adding the value in the register 311 to that on the register 310. While the position of the decimal point for the quotient and remainder is not shown in the diagram because it is not essential for the understanding of the present invention, it can be determined by known method from the number of FIGS. shifted for the purpose of normalization in the setting of the dividend and divisor on the registers 310 and 303 and from the number of operations repeated for the addition and subtraction.

Figure 4:
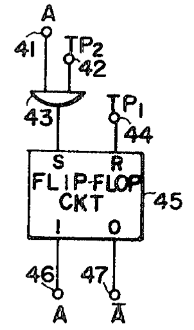
FIGS. 4, 5, 6*n*–6*c* and 7 are diagrams showing exemplary arrangements of the components of the embodiment shown in FIG. 3.

FIG. 4 is a circuit diagram showing one practical example of the registers shown in FIG. 3, illustrating a register unit circuit for one FIG. By juxtaposing a desired number of such unit circuits, it is possible to form the individual registers shown in FIG. 3. Numeral 45 designates a register consisting, for example, of a flip-flop circuit. As its set input, an input signal $A$ to be held by the register is introduced through a terminal 41. An AND-circuit 43 gives a logical product of a timing signal $TP_2$ from a terminal 42 and the input signal, and in synchronized relation with the timing signal $TP_2$ the input signal is held by the register. At a reset input terminal 44 is introduced a timing signal $TP_1$ ahead of said timing signal $TP_2$, so that the register is first reset by the resetting timing signal $TP_1$ and then is set by the input signal. As an alternative, it is possible to provide at the terminal 44 and AND circuit similar to the AND-circuit 43 and provide input terminals for an inverted signal of said input signal and for the timing signal $TP_2$ thereby to give a logical product of the two signals as the input signal. In such case, the register 45 need not be reset but the new input signal can be set in a single step by means of the timing signal $TP_2$ alone. Thus, at the output terminal 46 of the register the input signal $A$ thereby retained appears, and at the output terminal 47 the inverted signal $\overline{A}$ of the input signal appears. A plurality of such unit circuits of register constitutes each of the individual registers shown in FIG. 3.

Figure 5:
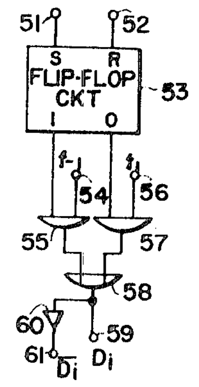

FIG. 5 is a circuit diagram of the component for one FIG. of the selecting means consisting of the gate circuits 304 and 306 of the embodiment shown in FIG. 3. For each FIG. of the signal on the register 303 there is provided one such unit circuit. In the diagram, reference numeral 53 indicates a register such as, for example, shown in FIG. 4. On this register a divisor is set by the signals from a set input terminal 51 and a reset input terminal 52. AND-circuits 55 and 57 obtain logical products, respectively, of the divisor signal which is the output on the "1" side of the register 53 and the partial quotient signal $f_{-1}$ indicating that −1 is given as the quotient applied on the terminal 54, and of the inverted form of the divisor signal which is the output on the "0" side of the register 53 and the partial quotient signal $f_1$ indicating that +1 is given as the quotient applied on the terminal 56. Thus, when the logical sum of the output signals of the AND-gates 55 and 57 is obtained by an OR-circuit 58, the divisor signal emerges on the output terminal 59 where the partial quotient signal $f_{7E'1}$ is "1" and the inverted divisor signal emerges on the same terminal where the signal $f_1$ is "1." The signal that appears on the output terminal 59 will hereinafter be represented by symbol $D_i$. On the output terminal 61, a signal $\overline{D_i}$ formed by inverting the signal $D_i$ through an inverter 60 is obtained. If an OR-NOR circuit such as the well-known current mode logic (CML) circuit which obtains both OR and NOR outputs is employed as the OR-circuit 58, the inverter 60 may be omitted.

Figure 6A:
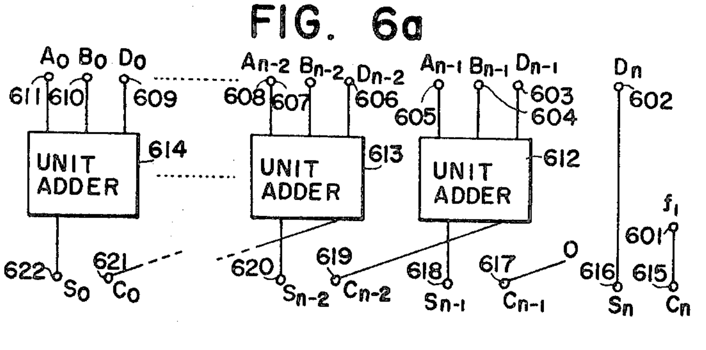
Figure 6B:
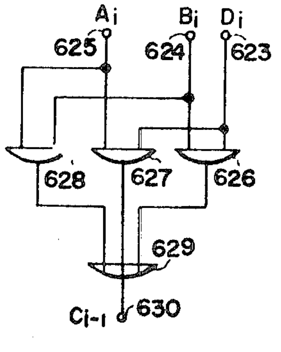
Figure 6C:
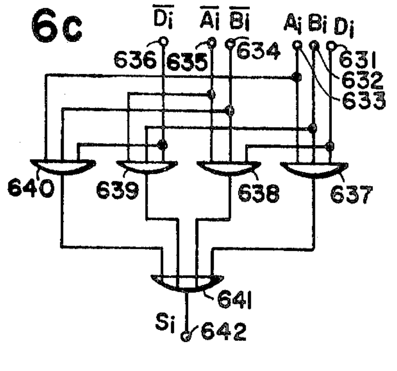

FIGS. 6*a*, 6*b* and 6*c* diagrammatically show a form of carry save adder for the embodiment shown in FIG. 3. In the FIGS., 6*a* shows the general construction, while 6*b* and 6*c* show the carry circuit and sum circuit, respectively, for one FIG. of the adder shown in 6*a*. As noted above this carry save adder does not provide for the carries of respective FIGS. upward to more significant FIGS. but retains them, so that the result of addition is expressed by two numbers of sum part $S$ and carry part $C$. At the same time, the augend, which represents the input signal of the adder, consists of two numbers $A$ and $B$, while the addend alone is represented by a single number $D$. In FIG. 6*a* reference numerals 612 to 614 indicate unit adders for one FIG. each. Terminals 605, 608 , 611 and terminals 604, 607 , 610 are connected respectively, to the output terminals of the corresponding FIGS. of the registers 301 and 302 shown in FIG. 3, and signals $A_{n'7E'1}$, $A_{n'7E'2}$, $A_0$ and $B_{n'7E'1}$, $B_{n'7E'2}$, $B_0$ are applied thereon. Terminals 602, 603, 606, , 609 are connected, respectively, to the input terminals of the corresponding FIGS. of the selecting means composed of the gate circuits 304 and 306 shown in FIG. 3, and signals $D_n$, $D_{n'7E'1}$, $D_0$ are applied thereon. Output terminals 616, 618, 620, , 622 are connected to the input terminals of the corresponding FIGS. of the register 310 shown in FIG. 3, and those outputs are held as sums $S_n$, $S_{n'7E'1}$, $S_0$ in said register. Output terminals 615, 617, 619, 621 are similarly connected to the corresponding FIGS. of the register 311 of FIG. 3, and those outputs are held in the register as carries $C_n$, $C_{n'7E'1}$, $C_0$. The circuit for the least significant FIG. (*n*th FIG.) shown in FIG. 6*a* is not provided with unit adders for the other FIGS. such as, for example, indicated at 612 to 614. This is because, in the divider according to the present invention, the *n*th FIGS. $A_n$ and $B_n$ of the augend $A$ and $B$ are always zero and it is apparent that the relation $C_{n'7E'1}0$, $S_n$=$D_n$ holds notwithstanding the provision of unit adders. On the terminal 601 a partial quotient signal $f_1$ is applied which indicates that +1 is given as the partial quotient, and 1 is added to the least significant FIG. of the inverted signal of the divisor so that the complement of the divisor can be introduced into the adder.

In FIG. 6*b* there is shown a circuit diagram of a form of carry circuit of the *i*th FIG. of each of the unit adders shown in FIG. 6*a*. The carry circuit consists of AND-circuits 626 to 628 and an OR-circuit 629. On the input terminals 623 to 625 are applied addend signal $D$ and augend signals $B_i$ and $A_i$ for the *i*th FIG., and by the AND-circuits 626 to 628 the logical products of different pairs of the signals $A_i$, $B_i$ and $D_i$ are obtained. Further, by the OR-circuit 629 the logical sum of the output signals from the AND-circuits 626 to 628 is given, and a carry part $C_{i\cdot 7E\cdot 1}$ is obtained on the terminal 630. This carry part $C_{i\cdot 7E\cdot 1}$ is not carried to the more significant FIG. but is held as it is.

A circuit diagram in FIG. 6*c* represents the sum circuit for the *i*th FIG. of each of the unit adders shown in FIG. 6*a*. The circuit consists of AND-circuits 637 to 640 and an OR-circuit 641. Input terminals 631 and 636 are connected, respectively, to the output terminals 59 and 61 of the selecting means illustrated in FIG. 5, while input terminals 633, 632 and 635, 634 are connected, respectively, to the output terminals on the "1" side and on the "0" side of the register, as shown in FIG. 4, which constitute the respective FIGS. of the registers 301 and 302 of FIG. 3. Accordingly, in the AND circuits 637 to 640 there are given the logical products of the three inputs, i.e., $A_i B_i D_i$, $A_i B_i D_i$, $A_i B_i D_i$, and $A_i B_i D_i$, and the logical sums of the output signals from the AND-circuits 637 to 640 are given by the OR-circuit 641, whereby a sum part $S_i$ is obtained at the output terminal 642.

The unit adders each for one FIG. as shown in FIG. 6*b* and FIG. 6*c* are entirely of the same construction as the binary adder circuit shown in FIG. 2. The difference is that, whereas in the adder circuit shown in FIG. 2 the carry $C_i$ serves as an input signal for the adder circuit for the next more significant FIG., the same signal in the unit adder is retained in the register. Thus, even though the number of the inputs is the same three inputs, the augend of the adder circuit of FIG. 6 is in the form of two signals and the unit adder of FIG. 6 does not receive the carry from the less significant FIG.; consequently, the sum consisting of two signals is obtained as output signals.

Figure 7:
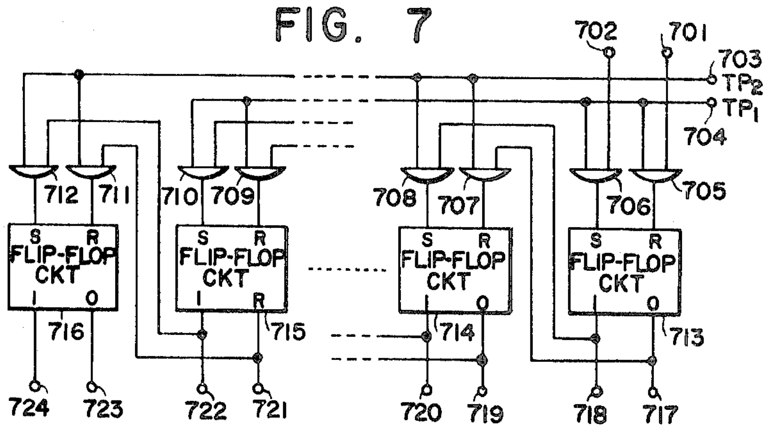

The functions performed by the pairs of registers 310 and 301, 311 and 302, 318 and 317, and 321 and 320 are only to shift and hold what are in the memory. It is for this reason possible to replace the pairs of registers by single-shift registers. FIG. 7 is a circuit diagram showing an example of conventional shift registers. In the diagram, indicated at 713 to 716 are, for example, flip-flop circuits, provided with AND-circuits 705 to 712 on their respective set and reset input terminals. In the AND circuits the outputs on the "1" side of the flip-flop circuits of the next lower stages are applied on the AND-circuits 708, 710, , 712 of the set side, and the outputs on the "0" side are applied on the AND-circuits 707, 709, 711 of the reset side. The AND-circuits 705, 706, , 709, 710 of the flip-flop circuits of the odd stages are gated by the timing signal $TP_1$ applied on the terminal 704, while the AND-circuits 707, 708, , 711, 712 of the flip-flop circuits of the even stages are gated by the timing signal $TP_2$ lagged in phase from the timing signal $TP_1$ applied on the terminal 703. Therefore, the input signal and its inverted signal applied, respectively, on the input terminals 702 and 701 are shifted leftward each time the timing signals $TP_1$ and $TP_2$ are applied alternately. The shift register shown in FIG. 7 may be used directly in place of the registers 318 and 317 or 321 and 320 shown in FIG. 3. And, it is only necessary to apply a partial quotient signal $f_1$ and its inverted signal $f_i$ or a partial quotient signal $f_{\cdot 7E\cdot 1}$ and its inverted signal $f_{\cdot 7E\cdot 1}$ on the input terminal 702 and 701. After shifting the memory contents in the registers 310 and 311 to the registers 301 and 302 of FIG. 3 the contents in the registers 310 and 311 are changed. In the shift register of FIG. 7, therefore, the odd stages may be disconnected from the even stages and the carry part or sum part which is the output signal of the adder 508 may be added instead of the output signals of the flip-flop circuits of the next lower stages, as the input signals for the AND circuits 705, 706, , 709, 710 on the input sides of the flip-flop circuits 713, , 715 on the odd stages. The signals stored in the shift register can be obtained from the output terminals 717 to 724 on the "1" sides and "0" sides of the flip-flop circuits.

Figure 8:
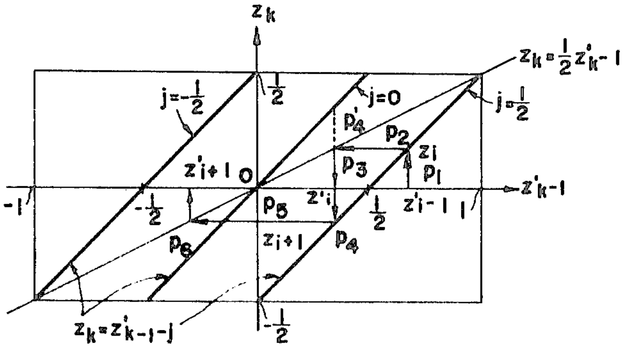
FIG. 8 is a graph explanatory of the principle of division, showing how the operation proceeds.

FIG. 8 is a graph which is explanatory of the principle of division according to the invention, and binary division is taken for example. As already described, the division is carried on as $$\left|\frac{y'_k}{d}\right|<1$$

is ensured by choosing a partial quotient $j$ to be $$\left|\frac{y'_{k-1}}{d}-j\right|<\frac{1}{r}$$

Since the radix $r$ is 2 in a binary operation, $j$ may be suitably chosen from ½, 0, and −½ provided that $$\left|\frac{y'_{k-1}}{d}\right|<1$$

Here if it is assumed that $$\frac{y'_{k-1}}{d}=Z'_{k-1},\ \frac{y'_{k-1}}{d}-j=\frac{y_k}{d}=Z_k,$$

and if $Z'_{k\cdot 7E\cdot 1}$ is plotted on the abscissa against $Z_k$ on the ordinate, then three lines $j$=½, $j$=0, and $j$=−½ can be drawn on condition that $Z_k=Z'_{k\cdot 7E\cdot 1}-j$. Also, because $|Z_k|<½|Z'_{k\cdot 7E\cdot 1}|<1$, the division can be performed within the rectangular frame as shown.

Assuming now that the partial remainder $y'_{i\cdot 7E\cdot 1}$ has been determined and $$\frac{p}{{}_{1-!,}h}={}^{1-!}{}_{,}Z$$

is at the point $P_1$ in FIG. 8, the line extended from $P_1$ parallelly with the axis $Z_k$ will cross only the line indicated by $j$=½ in the rectangular frame. The crossing point will hereinafter be referred to as the intersection $P_2$. Thus, ½ is given as the partial quotient $j$, and $Z'_{i\cdot 7E\cdot 1}$−½ is plotted as the ordinate $Z_{zi}$ for the intersection $P_2$. Next if the intersection $P_2$ is extended parallelly with the axis $Z'_{i\cdot 7E\cdot 1}$ to find an intersection $P_3$ with the straight line $Z_k=½Z'_{k\cdot 7E\cdot 1}$ and if $Z'_i$ is plotted as the abscissa, then $Z'_i=2Z_i$ will be obtained. Further, if the intersection section $P_3$ is extended parallely with the axis $Z_k$, it will be seen that it will this time cross the tow lines $j$=½ *and* $j$=0 at intersections $P_4$ and $P_4'$, respectively, within the rectangular frame. In this case, either ½ or 0 may be chosen as the partial quotient, though the line $j$=½ is chosen as indicated at the intersection $P_4$. By the procedure above described, the intersection $P_5$ where $Z_{i+1}=Z'_i$−½ is also found. Next, by the intersection $P_6$ with $Z_k=½Z'_{k\cdot 7E\cdot 1}$, again $Z'_{i+1}$ is obtained. Inasmuch as $Z'_{i+1}$ is a negative value, it will be apparent from the graph that the next partial quotient may be chosen from either $j$=−½ or $j$=0. As will be understood from the foregoing description, if $Z'_{i\cdot 7E\cdot 1}$ <1, then its intersection with $Z_k=Z'_{k\cdot 7E\cdot 1}-j(j$=−½,0, ½) will be always determined to obtain $Z_i$ <½, and $Z'_i$ <1 will be ensured to carry out the division in succession.

In actual operation for division, $$Z'_{i-1}=\frac{y'_{i-1}}{d}$$

is not known, and therefore the partial quotient $j$ must be calculated from the partial remainder $y'_{i\cdot 7E\cdot 1}$ and divisor $d$. Hence, generally a decoder is required that chooses $j$ so as to satisfy the conditions as illustrated in FIG. 8.

Figure 9:
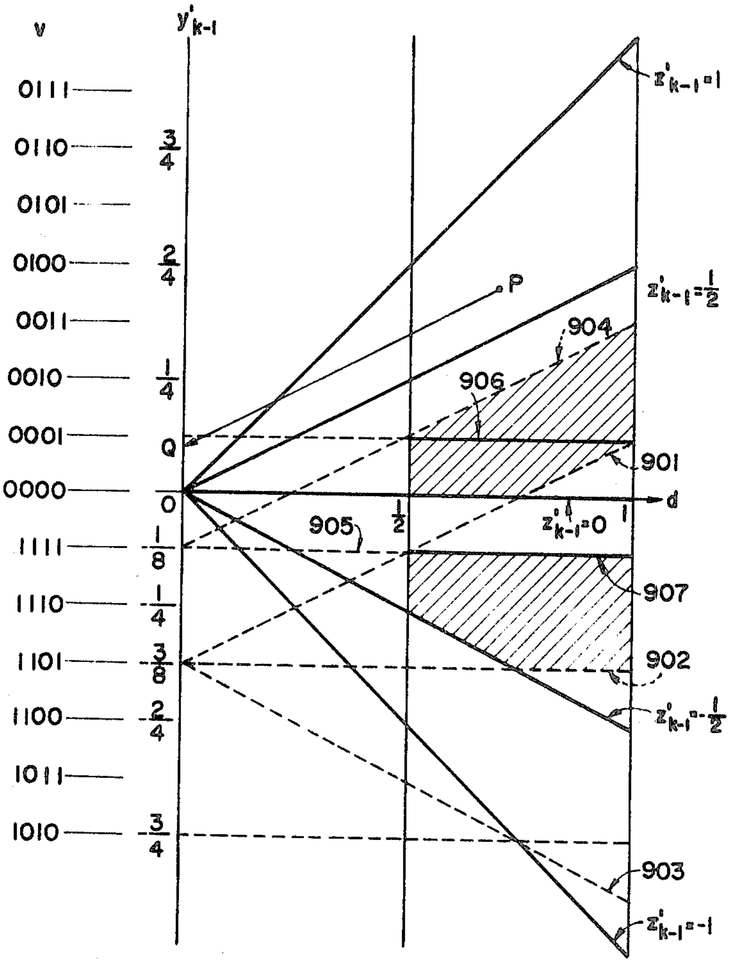
FIG. 9 is a graph explanatory of the way in which a decoding table is prepared for the decoder in the embodiment shown in FIG. 3.

FIG. 9 is a graph illustrating how the decoder 312 of the embodiment shown in FIG. 3 is made. On the abscissa is shown the divisor $d$ and on the ordinate the partial remainder $y'_{k\cdot 7E\cdot 1}$. Since it is apparent from FIG. 8 that when ½≦$Z'_{i\cdot 7E\cdot 1}$<1,$j$=½ is chosen, when 0<$Z'_{k\cdot 7E\cdot 1}$<½,$j$=0 or $j$=½, when $Z'_{k\cdot 7E\cdot 1}$=0,$j$=0, when −½<$Z'_{k\cdot 7E\cdot 1}$0,$j$=0 or $j$=−½, and when −1<$Z'_{k\cdot 7E\cdot 1}$≦-½, $j$=−½, it follows that if straight lines $$Z'_{k-1}=\frac{y'_{k-1}}{d}=1,\ \frac{1}{2},\ 0,\ -\frac{1}{2},$$

are drawn in FIG. 9 the regions enclosed by the respective lines correspond to the selectable regions for the partial quotient $j$ as above described. It is therefore useful to draw border lines which may be designated only by the partial remainder $y'_{k\cdot 7E\cdot 1}$ and divisor $d$ within the regions enclosed by the straight lines $z'_{k\cdot 7E\cdot 1}$ =½ and $Z'_{k\cdot 7E\cdot 1}$=0 and by the straight lines $Z'_{k\cdot 7E\cdot 1}$=0 and $Z'_{k\cdot 7E\cdot 1}$=−½ and then to provide boundaries, respectively, for $j$=½ and 0 and for $j$=0 and −½.

In the divider according to the present invention, the partial remainder $y'_{k\cdot 7E\cdot 1}$ is allowed to be in the form of two numbers consisting of sum and carry signals, thereby eliminating a sum operation of the two numbers. While a conventional divider requires a partial remainder in a single number when the sum operation of the two numbers is to be calculated to obtain a single numbered partial remainder by means of the adder of FIGS. 1 and 2, the operation time of the addition will be so prolonged that the carry save adder will become useless. In the decoder of the present invention, therefore, an inventive method is adopted which consists of calculating a round FIG. Y of the partial remainder $y'_{k\cdot 7E\cdot 1}$ from higher or more significant FIGS. of the respective two numbers representing the partial remainder, and then obtaining the partial quotient $j$ from the round FIG. Y and divisor $d$.

In the registers 310 and 311 shown in FIG. 3 there are introduced two numbers representing a partial remainder, i.e., sum part $S$ and carry part $c$. The greater the number of FIGS. to be used as the more significant FIGS. for $S$ and $C$, the more accurate will be the round FIG. Y obtained for the partial remainder $y'_{k\cdot 7E\cdot 1}$. However, this will make the decoder highly complicated in construction. Explanation will therefore be made here for the case in which five bits are used including the sign bit as the more significant FIGS. for the parts $S$ and $C$, and the sum of the parts $S$ and $C$ each having the five bits are calculated and further four bits of the more significant FIGS. of the sums are used to represent the round FIG. Y. Also, as regards the binary notation, description will be made of an example of a method whereby the initial bit is represented by a sign bit, positive signs are expressed as "0" and negative signs are expressed as "1," and a decimal point is provided immediately after the sign bit, and the negative notation is expressed as the 2's complement thereof. According to this notation, 1 and −1 are linked together because the addition of 1 to the least significant FIG. of such a numerical value, i.e., 0111 1 as close to 1 will give 1000 0 (=−1).

If it is assumed that the errors in disregard of the sixth and subsequent bits of $S$ and $C$ which represent the partial remainder $y'_{k\cdot 7E\cdot 1}$ are $\epsilon_1$ and $\epsilon_2$, respectively, and if the value obtained by adding the five bits of $S$ and $C$ is $u$, then we obtain $y_{k\cdot 7E\cdot 1}u+\epsilon_1+\epsilon_2$ (where 0 $\epsilon_1$, $\epsilon_2<2^{\cdot 7E\cdot 4}$). Further, if the 5th bit of $u$ is disregarded and the error is accordingly assumed to be $\epsilon_3$, then the relation as represented by equation (3) below will hold between the round FIG. Y and partial remainder $y'_{k\cdot 7E\cdot 1}$.

$$y'_{k\cdot 7E\cdot 1}=Y+\epsilon_1+\epsilon_2'+\epsilon_3 \qquad (3)$$

where $(\leqq \epsilon_1, \epsilon_2<2^{\cdot 7E\cdot 4}, 0\leqq\epsilon_3\leqq 2^{\cdot 7E\cdot 4}$.

Here, because $(\leqq\epsilon_1+\epsilon_2+\epsilon_3<3\times 2^{\cdot 7E\cdot 4}<2^{\cdot 7E\cdot 2}$, the relation of equation (4) is established.

$$Y\leqq y'_{k\cdot 7E\cdot 1}Y+2^{\cdot 7E\cdot 2} \qquad (4)$$

For this reason, it can occur that $Y+2^{\cdot 7E\cdot 2}>1$ when Y is close to 1, and there is the danger of $y'_{k\cdot 7E\cdot 1}$ being actually close to −1 (because 1 and −1 are linked for the purpose of notation as above described). Since $-1\leqq Y<1$, there is the possibility that, from equation (4), the partial remainder $y'_{k\cdot 7E\cdot 1}$ within the range of $-1\leqq y'_{k\cdot 7E\cdot 1}<-1+2^{\cdot 7E\cdot 2}$ may be regarded as a positive number in terms of the round FIG. Y. In FIG. 9, the number at the point P gives ½ as the partial quotient $j$, and the remainder $y_{k\cdot 7E\cdot 1}$½ $d$ is calculated as the ordinate $y'_{k\cdot 7E\cdot 1}$ at the point Q where the axis of $y'_{k\cdot 7E\cdot 1}$ is crossed by a straight line drawn parallel to the straight line $$Z'_{k-1}=\frac{y'_{k-1}}{d}=\frac{1}{2}$$

from the point P. As $y'_k=2y_k$, it is only necessary to keep $y_k$ from coming into the range of $-½<y_k<-⅜$ in order to prevent the next partial remainder $y'_k$ from coming within the range of $-1<y'_k<-¾$. Therefore, it is important to draw border lines of $j$=½ and 0 or $j$=0 and −½ in the range above the dotted lines 901 to 903 drawn parallelly to the lines of $Z'_{k\cdot 7E\cdot 1}$=½, 0, −½ from the point $y'_{k\cdot 7E\cdot 1}$=−⅜ on the axis $y'_{k\cdot 7E\cdot 1}$, so that the range in which ½ is given as the partial quotient $j$ does not come under the dotted line 901 and the range in which 0 is given does not come under the dotted line 902.

There is also the possibility that, from equation (4), the fourth bit (equivalent to ⅛) including the sign bit of the round FIG. Y may be different from the fourth bit of the actual partial remainder $y'_{k\cdot 7E\cdot 1}$. For this reason, when Y plus ⅛ exceeds the straight line $Z'_{k\cdot 7E\cdot 1}$=½ or $Z'_{k\cdot 7E\cdot 1}$=0, the border lines should be always so provided as to give $j$=½ or 0 as the partial quotient respectively. The border lines must therefore be provided in the ranges below the dotted lines 904 and 905 in FIG. 9. The divisor $d$ is normalized as it is set in the register shown in FIG. 3, in such a manner that the sign bit is positive, and the bit immediately behind the sign bit becomes "1" by shifting the divisor. Hence $½\leqq d<1$.

From the foregoing description it will be appreciated that the border lines to give either ½ or 0 or either 0 or −½ as the partial quotient $j$ must be provided in the hatched zone surrounded by the dotted lines 904 and 901 between the straight lines $Z'_{k\cdot 7E\cdot 1}$=½ and $Z'_{k\cdot 7E\cdot 1}$=0 and also in the hatched zone surrounded by the dotted lines 905 and 902 between the straight lines $Z'_{k\cdot 7E\cdot 1}$=0 and $Z'_{k\cdot 7E\cdot 1}$=−½. Because the round FIGS. Y give values at intervals as shown in FIG. 9, the border lines to provide within the said ranges may take the form of lines 906 and 907, for example. The points on the lines 906 and 907 come within the regions of the partial quotient $j$=½ and $j$=0.

From the results shown in FIG. 9, a decoding table may be prepared as provided in table 1.

In table 1, $f_1$ is a symbol which indicates that $j$=½ is given as the partial quotient, and symbol $f_{\cdot 7E\cdot 1}$ indicates that $j$=−½. The symbol $y_k$ represents an operation which is actually performed.

FIGS. 10*a* through 10*g* provide circuit diagrams illustrating an example of a decoder constructed on the basis of the decoding table given in table 1 and adapted to be used as the decoder 312 of the embodiment shown in FIG. 3. As can be seen from table 1 $f_1$ is 1 when the sign bit of the round FIG. Y of the partial remainder is "0" and at least one of the second to fourth bits is "1," while $f_1$ is 1 when the sign bit of Y is "1" and at least one of the second to fourth bits is "0." Accordingly, the decoder may be constructed by first obtaining the round FIG. Y from the more significant FIGS. for the two numbers $S$ and $C$ and then in conformity to the decoding table. The decoder may alternatively be constructed by calculating $f_1$ and $f_{\cdot 7E\cdot 1}$ directly from the more significant FIGS. of the two numbers $S$ and $C$. The latter method is resorted to in ishown FIGS. 10*a* through 10*g*.

TABLE 1

| Ω | $f_1$ | $f_{-1}$ | $y_k$ |
|---|---|---|---|
| 01– | 1 | 0 | |
| 001– | 1 | 0 | $y'_k-½d$ |
| 0001 | 1 | 0 | |
| 0000 | 0 | 0 | $y'_k$ |
| 1111 | 0 | 0 | |
| 1110 | 0 | 1 | |
| 1101 | 0 | 1 | |
| 1100 | 0 | 1 | $y'_k+½d$ |
| 10– | 0 | 1 | |

and inverted

Figure 10A:
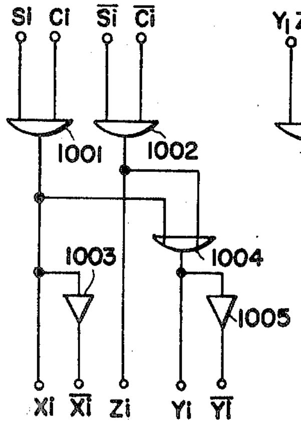
FIGS. 10*a* through 10*g* are circuit diagrams exemplary of a decoder made in accordance with the decoding table of FIG. 9.

In FIG. 10*a* the circuit arrangement is so designed that, for the five bits of the more significant FIGS. for the registers 310 and 311 shown in FIG. 3, $X_i=S_i\cdot C_i$, $Z_i=\overline{S_i}\cdot\overline{C_i}$, $Y_i=S_i\cdot C_i+\overline{S_i}\cdot\overline{C_i}$ and inverted signals of $X_i$, $Y_i$, i.e., $\overline{X_i}$, $\overline{Y_i}$, are obtained from the signals $S_i$ and $C_i$ held on the corresponding FIGS. and their inverted signals $\overline{S_i}$ and $\overline{C_i}$. The same circuit components are arranged for each FIG. of the registers 310 and 311. AND-circuits 1001 and 1002 are provided which obtain logical products of $S_i$ and $C_i$ and of $\overline{S_i}$ and $\overline{C_i}$ and use them as $X_i$ and $Z_i$, respectively. The output signals of these two AND circuits are put together by an OR-circuit 1004 to obtain a logical sum as $\overline{Y_i}$. Inverters 1003 and 1005 obtain inverted signals $\overline{X_i}$ and $Y_i$ from the signals $X_i$ and $Y_i$. Consequently, $X_i$ gives an output "1" when $S_i$ and $C_i$ are both 1 and $Z_i$ gives the output "1" when the both are 0, while $Y_i$ produces an output "1" when $S_i$ agrees with $C_i$. $\overline{X_i}$ becomes "1" when at least either $S_i$ or $C_i$ is 0, while $\overline{Y_i}$ becomes "1" when $S_i$ and $C_i$ dissimilar signals, or when only one of them is 1.

Figure 10B:
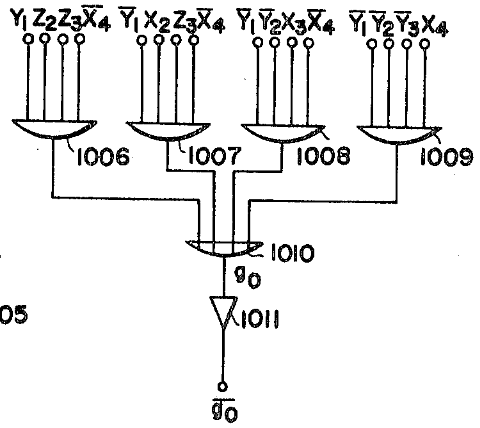

In FIG. 10*b* there is shown a circuit for obtaining an inverted signal $\overline{g_0}$ from a signal $g_0$ which indicates that all of the lower three bits are 0 excepting the sign bit of the round FIG. Y from the signals $S_i$ and $C_i$ for the respective FIGS. ($i$=0, 1, 5). As the input signal, the output signals from FIG. 10*a* are used, and here is shown indirectly the relation between $S_i$ and $C_i$. To be more specific, AND-circuits 1006 to 1009 take the logical products of the different groups of input signals ($Y_1, Z_2, Z_3, \overline{X_4}$), ($\overline{Y_1}, X_2, Z_3, \overline{X_4}$), ($\overline{Y_1}, \overline{Y_2}, X_3, \overline{X_4}$) and ($\overline{Y_1}, \overline{Y_2}, \overline{Y_3}, X_4$) and obtain the logical sum of the output signals by an OR-circuit 1010, in the form of said signal $g_0$. Accordingly, the signal $g_0$, which indicates that at least one of the less significant three bits of Y includes 1, is obtained by passing the signal $g_0$ through an inverter 1011.

Figure 10F:
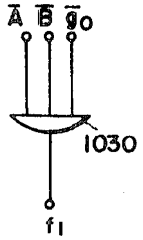
Figure 10C:
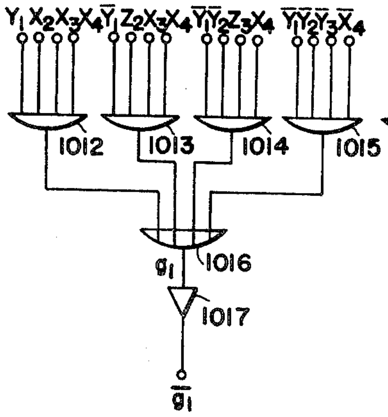

FIG. 10*c* shows a circuit for finding an inverted signal $g_1$ of signal $g_1$ which indicates that all of the lower three bits of the round FIG. Y become 1, in contrast to the arrangement shown in FIG. 10*b* above. By means of AND-circuits 1012 to 1015, logical products of different groups of input signals ($Y_1, X_2, X_3, X_4$), ($\overline{Y_1}, Z_2, X_3, X_4$), ($\overline{Y_1}, \overline{Y_2}, Z_3, X_4$) and ($\overline{Y_1}, \overline{Y_2}, \overline{Y_3}, \overline{X_4}$) are obtained, and the logical sum of the output signals of these AND-circuits 1012 to 1015 is obtained by an OR-circuit 1016 to get the signal $g_1$. Therefore, the signal $\overline{g_1}$ which indicates that at least one of the less significant three bits of Y include 0 is obtained by passing the signal $g_1$ through an inverter 1017.

Figure 10D:
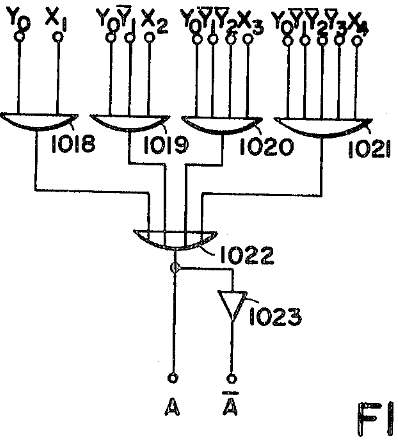
Figure 10G:
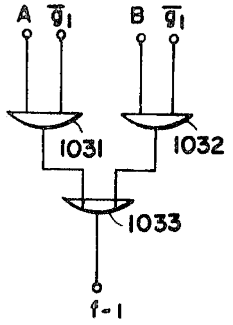
Figure 10E:
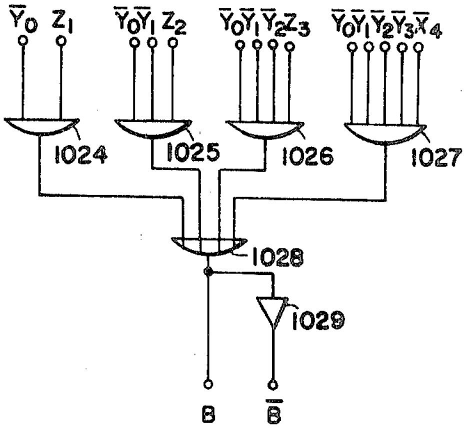

Both FIGS. 10*d* and 10*e* are intended to see whether the sign bit of round FIG. Y is 1 or o. The circuit arrangement FIG. 10*d* indicates that the sign bit is made 1 by a carry from the less significant FIG., while FIG. 10*e* indicates that the sign bit becomes 1 in the absence of any such carry. In FIG. 10*d*, AND-circuits 1018 to 1021 give logical products of the different groups of ($Y_0, X_1$), ($Y_0, \overline{Y_1}, X_2$), ($Y_0, \overline{Y_1}, \overline{Y_2}, X_3$) and ($\overline{Y_0}, \overline{Y_1}, \overline{Y_2}, \overline{Y_3}, X_4$) and an OR-circuit 1022 gives the logical sum of the output signals of the AND-circuits 1018 to 1021, whereby a signal $A$ is obtained and, at the same time, the signal $A$ is passed through an inverter 1023 to get a signal $A$. In FIG. 10*e*, AND-circuits 1024 to 1027 give logical sums of the different groups of ($\overline{Y_0}, Z_1$), ($\overline{Y_0}, \overline{Y_1}, Z_2$), ($\overline{Y_0}, \overline{Y_1}, \overline{Y_2}, Z_3$) and ($\overline{Y_0}, \overline{Y_1}, \overline{Y_2}, \overline{Y_3}, X_4$) and an OR-circuit 1028 gives the logical sum of the output signals of the AND-circuits 1024 to 1027, so that a signal $B$ is obtained and also the signal is passed through an inverter 1029 to get a signal $\overline{B}$. The inverters 1005, 1011, 1017, 1023, and 1029 may be omitted when the OR-NOR circuits as described in connection with FIG. 5 are employed in place of the OR-circuits 1004, 1010, 1016, 1022 and 1028 because the OR-NOR circuits can simultaneously give the inverted signals.

From the signals $\overline{g_0}$, $\overline{g_1}$, $A$, $\overline{A}$, $B$ and $\overline{B}$ thus given, the signals $f_1$ and $f_{\cdot 7E\cdot 1}$ shown in the decoding table of table 1 can be obtained through the circuits shown in FIGS. 10*f* and 10*g*. In FIG. 10*f*, the signal $f_1$ becomes 1 when the sign bit of round FIG. Y is 0 and any of the lower three bits of Y is not 0. Here an AND-circuit 1030 gives as $f_1$ the logical product of input signals $\overline{A}$, $\overline{B}$ and $g_0$. Inasmuch as it is known that $\overline{A+B}$ makes the sign bit 1, the sign bit should become 0 when $\overline{A+B}=\overline{A}\cdot\overline{B}$. In FIG. 10*g*, AND-circuits 1031 and 1032 get the logical products of input signals in pairs of $A, \overline{g_1}$ and $B, \overline{g_1}$ respectively, and an OR-circuit 1033 gets the logical sum of the output signals of the AND circuits thereby to obtain the signal $f_{\cdot 7E\cdot 1}$. Thus, $f_{\cdot 7E\cdot 1}$ becomes 1 when the sign bit is 1 and the less significant three bits contain any which is not 1, and the circuit arrangement indicates the relation $(A+B)\cdot\overline{g_1}+B\cdot\overline{g_1}$.

While a divider has been described whereby a partial quotient for one binary figure is obtained at one time, it is also possible in accordance with the present invention to provide a divider which makes it possible to obtain partial quotients for a plurality of figures at the same time. In the latter case, binary division for two figures in each operation may be regarded as a division of quaternary number and, similarly, binary division for $n$-figures in each operation may be regarded as the division of $2^n$ notation, and therefore the binary one-figure division can be extended for the latter purpose.

Figure 11:
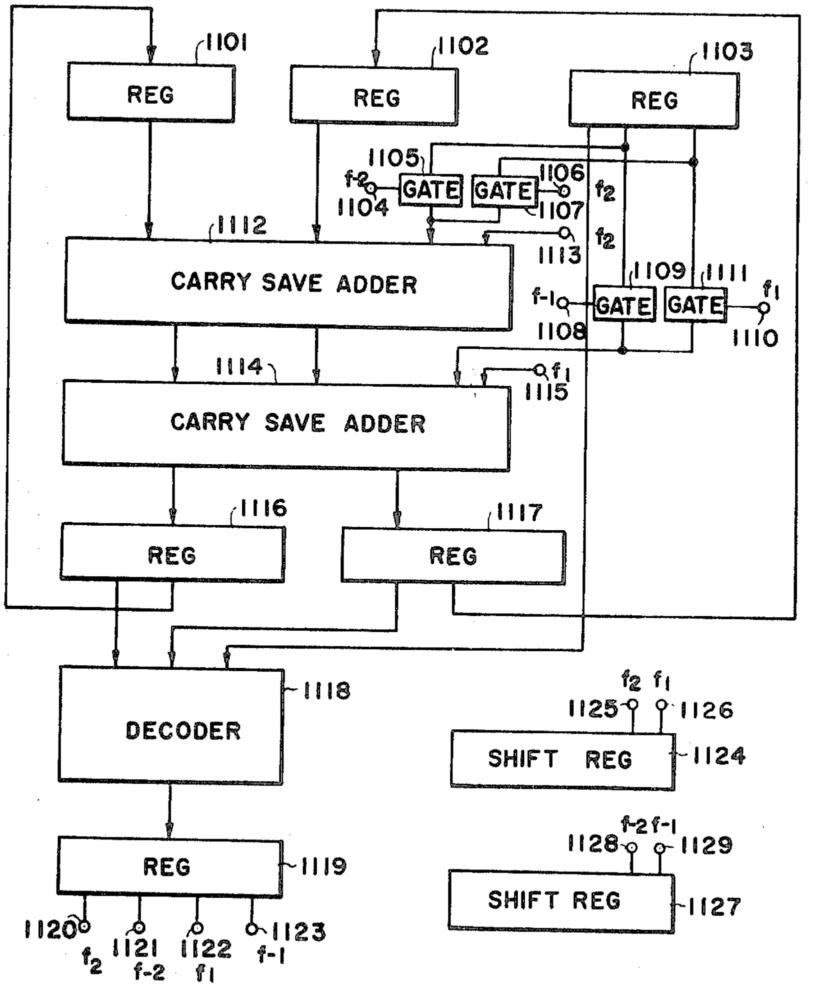
FIG. 11 is a diagram illustrating the general construction of another embodiment of the invention.

FIG. 11 is a schematic arrangement illustrating another embodiment of the present invention as a divider for giving partial quotients of a binary number made up of plural figures. The embodiment will now be described as applied to an operation for giving partial quotients for two figures of a binary number. In FIG. 11, registers 1101 to 1103, 1116, 1117 and 1119 correspond to the registers 301, 302, 303, 310, 311, 313, and 314 of FIG. 3, and consist, for example, of circuit arrangements as shown in FIG. 4. However, the register 1119 is so constructed as to hold the partial quotient of four bits, and when a partial remainder consisting of two numbers $S$ and $C$ is transmitted from the registers 1116 and 1117 to the registers 1101 and 1102, the signal is shifted leftward by two bits, the two more significant bits being emptied while the two less significant bits being set to 0.

Carry save adders 1112 and 1114 are in two-stage cascade connection with each other. When an operation of binary division is to be performed for a partial quotient of $n$-figures at one time, these carry save adders must be cascade connected in $n$-stages. On the preadder 1112, the partial remainder consisting of two numbers $A$ and $B$ which are held by the registers 1101 and 1102 and the divisor held by the register 1103 are applied with or without inversion through gate circuits 1105 and 1107. The gate circuits 1105 and 1107, together with the gate circuits 1109 and 1111 which control the divisor given to the adder 1114, constitute a selecting means, and each of such component circuits has a circuit construction as shown in FIG. 5. Thus, when the more significant bit of a two-bit partial quotient is 1, the signal $f_2$ applied on on the terminal 1106 becomes 1, and an inverted signal of the divisor is given to the adder 1112. Similarly, when the more significant bit is −1, the signal $f_{\cdot 7E\cdot 2}$ that is applied on the terminal 1104 becomes 1, and the divisor signal is given as it is to the adder. When the less significant bit of the partial quotient is 1, the signals $f_1$ applied on the terminal 1110 becomes 1 and an inverted signal of the divisor is given to the adder 1114, and when the same bit is −1, the signal $f_{\cdot 7E\cdot 1}$ applied on the terminal 1108 becomes 1 and the divisor signal is given to the adder 1114. Those signals from the register 1103 which are given to the adder 1114 are applied to figures of the adder lower or less significant by one bit than those of the signals on the adder 1112. The input signals to the adder 1114 represent those signals from the register 1103 and also the sum and carry parts which form the output signal of the adder 1112. The partial remainder for the next step which is the output signal of the adder 1114 is divided and held separately by the registers 1116 and 1117. The reason for which the signals $f_2$ and $f_1$ are applied, respectively, on the terminals 113 and 115 is that, as already explained in conjunction with the embodiment shown in FIG. 3, it ensures accurate subtraction through the application of the divisor complement to the adder.

The decoder of this embodiment, which is generally indicated at 1118, is slightly different from the decoder 312 of FIG. 3 because it is connected also with a plurality of more significant figures of the register 1103 and obtains the divisor signal as another input signal. The output signal of this decoder 1118 represents a partial quotient of two figures, which is held by a register 1119 and is obtained through terminals 1120 to 1123 as signals $f_2$, $f_{\cdot 7E\cdot 2}$, $f_1$ and $f_{\cdot 7E\cdot 1}$, respectively. These signals not only serve as the input signals for the gate circuits and adders but are also applied on the input terminals 1125, 1128, 1126, and 1129 of shift registers 1124 and 1127 and are held thereby as partial quotient signals, just in the same way as in the embodiment of FIG. 3. The only difference from the latter lies in the fact that the shift registers 1124 and 1127 are shifted leftward by two bits prior to the application of the partial quotient signals $f_2$, $f_1$ and $f_{\cdot 7E\cdot 2}$, $f_{\cdot 7E\cdot 1}$. While the shift registers to be used here may be those as shown in FIG. 6, they may of course be fabricated, as an alternative, by combining two registers, such as the registers 317, 318 and 320, 321, as exemplified in FIG. 3.

Figure 12:
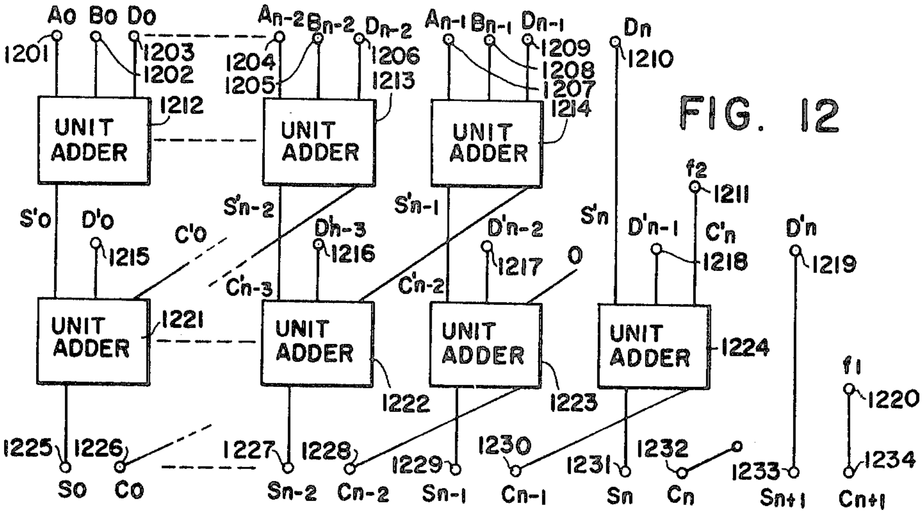
FIG. 12 is a diagram showing a form of construction of the adder for the embodiment of FIG. 11.

FIG. 12 is a schematic diagram illustrating the interrelations among the carry save adders 1112 and 1114, registers 1101, 1102, 1116 and 1117, and gate circuits 1105, 1107, 1109 and 1111 of the embodiment shown in FIG. 11.

Indicated at 1212 to 1214 and at 1221 to 1224 are unit adders for one figure each, and each unit adder consists of a carry circuit and a sum circuit shown, respectively, in FIG. 6*b* and *c*. On the input terminals 1201 to 1209 of the unit adders 1212 to 1214 are applied the signals $A_i$, $B_i$ and $D_i$ of the figures corresponding to the registers 1101, 1102 and gate circuits 1105, 1107, and a sum part $S'_i$ and carry part $C'_{i\cdot 7E\cdot 1}$ are produced as output signals. The signal $D_n$ of the least significant figure of the gate circuits applied on the terminal 1210 and the signal $f_2$ applied on the terminal 1211 directly take the form of a sum part $S'_n$ and carry part $C'_n$ because $A_n=B_n=0$. This relationship $A_n=B_n=0$ holds as the partial remainder signal transferred from the registers 1116 and 1117 to the registers 1101 and 1102 is shifted leftward by two bits, while the latter two bits are set to 0. Next, the input signals for the unit adders 1221 to 1224 on the second stage are the signals $S'_i$ and $C'_i$ from the adders on the first stage, and the signal $D'_{i\cdot 7E\cdot 1}$ from the gate circuits 1109 and 1111 applied on the terminals 1215 to 1218. Although there cannot be any corresponding signal from the gate circuit applicable to the terminal 1215, a signal same as the signal $D'_0$ which corresponds to the sign bit of the signal from the gate circuit applied to the unit adder of the next less significant figure (not shown) is actually applied on said terminal 1215. Accordingly, on the output terminals 1225 to 1231 are obtained the sum parts $S_i$ and carry parts $C_{i\cdot 7E\cdot 1}$ as the output signals from the unit adders 1221 to 1224. The signals $D'_n$ from the last figures of the gate circuits and $f_1$ applied on the terminals 1219 and 1220 appear directly as signals $S_{n+1}$ and $C_{n+1}$ on the output terminals 1233 and 1234 because of the relationship $A_{n+1}=B_{n+1}=0$. Also, 0 is given to the output terminal 1232 since the relationship $A_{n+1}=B_{n+1}=0$ makes it impossible to obtain a carry $C_n$. The signals $S_i$ and $C_i$ thus obtained are held on the corresponding figures of the registers 1116 and 1117, for subsequent use as the next partial remainder to obtain new partial quotient signals.

Figure 13:
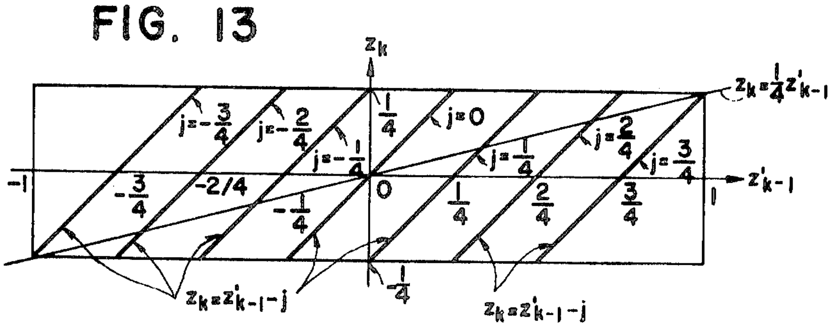
FIGS. 13 and 14 are graphs showing how the decoding table to be used for the decoder of the embodiment shown in FIG. 11 is made.

FIG. 13 is a graph showing the relation between the partial remainder $y'_{k\cdot 7E\cdot 1}$ and the partial quotient $j$ to be given in the division using quaternary number as in FIG. 8. As already pointed out, the binary operation in two figures may be regarded as an operation of quaternary number in one figure, and therefore the partial quotient $j$ which may be given provided that the radix $r=4$ is of seven different values, i.e., $j=-¾$, $-2/4$, $-¼$, 0, ¼, 2/4 and ¾. The division must be carried on in such a manner as to satisfy the conditions $$\left|\frac{y'_{k-1}}{d}\right|<1$$

and $$\left|\frac{y'_{k-1}}{d}-j\right|<\frac{1}{4}$$

, and if the abscissa is $$Z'_{k-1}=\frac{y'_{k-1}}{d}$$

and the ordinate is $$Z_k=\frac{y'_{k-1}}{d}-j,\text{ then }|Z'_{k-1}|<1,\ |Z_k|<\frac{1}{4}$$

and $j$ should be chosen so that $Z'_{k\cdot 7E\cdot 1}$ and $Z_k$ can always be given within the rectangular frame shown. Thus, given a certain $Z'_{k\cdot 7E\cdot 1}$, the $j$ of the straight line $Z_k=Z'_{k\cdot 7E\cdot 1}-j$ which is crossed by a line extended parallelly with the $Z_k$ axis within the frame shown may be chosen as the partial quotient, when the ensuing $Z'_{k\cdot 7E\cdot 1}$ can be ensured to be $|Z'_{k\cdot 7E\cdot 1}|<1$ and the division can be carried out, exactly in the same way as described in connection with FIG. 8. The only difference resides in that because of the quaternary number used in this case the straight line $Z_k=¼Z'_{k\cdot 7E\cdot 1}$ multiplies $Z_k$ by four to give the following $Z'_k$.

Figure 14:
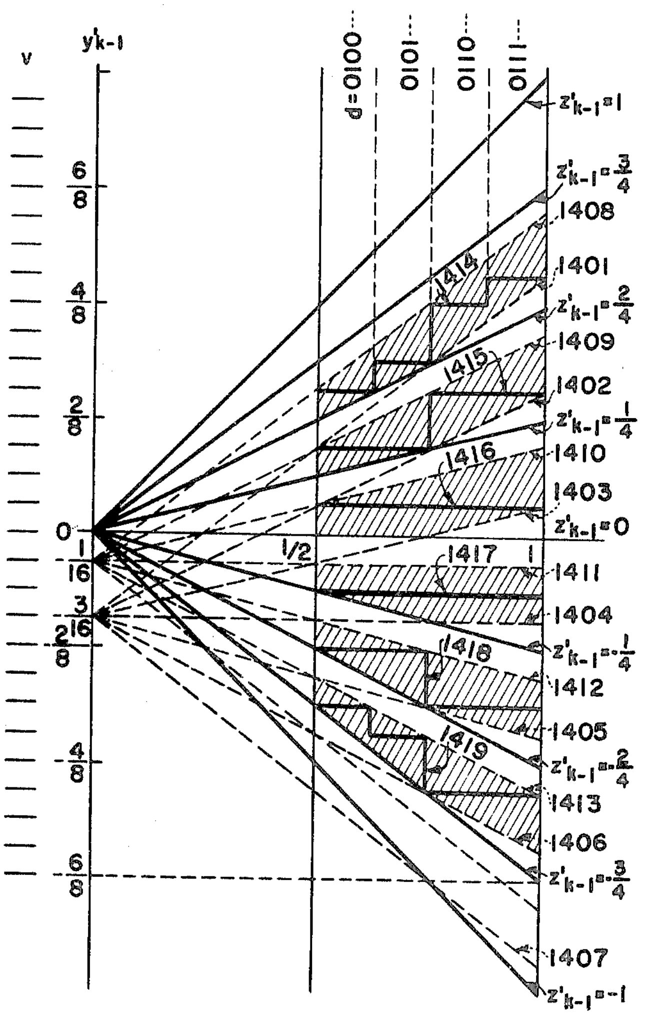

FIG. 14 is a graph explanatory of the principles on which the decoder 1118 of FIG. 11 is made. In the graph, which is similar to the graph shown in FIG. 9, the abscissa represents the divisor $d$ and the ordinate represents the partial remainder $y'_{k\cdot 7E\cdot 1}$. The straight lines which extend radially from the origin, i.e., $Z'_{k\cdot 7E\cdot 1}=1$, ¾, 2/4, , 0, , −¾, −1, represent the values of divided lines of $Z'_{k\cdot 7E\cdot 1}$ in choosing the partial quotient $j$, as will be seen from FIG. 13. It is therefore necessary to provide boundaries for choosing any of $j=¾$ and $j=2/4$, $j=2/4$ and $j=¼$, , $j=-2/4$ and $j=-¾$ in the regions enclosed by the straight lines $Z'_{k\cdot 7E\cdot 1}=¾$ and $Z'_{k\cdot 7E\cdot 1}=2/4$, $Z'_{k\cdot 7E\cdot 1}=2/4$ and $Z'_{k\cdot 7E\cdot 1}=A$Y, $Z'_{k\cdot 7E\cdot 1}=-2/4$ and $Z'_{k\cdot 7E\cdot 1}=-¾$. In the present embodiment, six more significant bits are taken including the sign bit each of the sum part $S$ and carry part $C$ held by the registers 1116 and 1117 shown in FIG. 11, in order to obtain the round figure Y of partial remainder $y'_{k\cdot 7E\cdot 1}$, and the sum of the two are obtained, and then only five more significant bits are taken. Thus, the round figure Y gives scattered values at intervals of 1/16 as shown in FIG. 14, and since the error $\epsilon$ with the partial $y'_{k\cdot 7E\cdot 1}$ is $0\ \epsilon<3\times 2^{\cdot 7E\cdot 5}<2^{\cdot 7E\cdot 3}$, a relationship of equation (5) holds:

$$Y\ y'_{k\cdot 7E\cdot 1}<Y+2^{\cdot 7E\cdot 3} \qquad (5)$$

If the partial remainder comes within the range of $-1<y'_{k\cdot 7E\cdot 1}<-7/8$ from equation 5 in view of the relation $-1\ Y<1$, there may occur the danger of a negative number close to −1 being erroneously recognized as a positive number close to 1. Therefore, from the relations $y_k=y'_{k\cdot 7E\cdot 1}-j$ and $y'_k=4y_k$, the partial quotient $j$ must be so given as to avoid the relation $-¼<y_k<-⅞\times¼<-3/16$. In FIG. 14, $y_k$ is given on the coordinates of the point where the axis $y'_{k\cdot 7E\cdot 1}$ is crossed by a straight line drawn parallelly to any of $Z'_{k\cdot 7E\cdot 1}=¾$, 2/4, −¾ the point decided by $y'_{k\cdot 7E\cdot 1}$ and $d$, and therefore an arrangement must be made lest the partial quotients $j$−¾, 2/4, −¾ should be conversely given in the ranges below the dotted lines 1401 to 1407 drawn parallelly to the straight lines $Z'_{k\cdot 7E\cdot 1}=¾$, 2/4, −¾ from the points of coordinates −3/16 on the axis $y'_{k\cdot 7E\cdot 1}$.

There is also the possibility that from the equation 5 the last bit (corresponding to 1/16) of the round figure Y may be different from the actual partial remainder $y'_{k\cdot 7E\cdot 1}$. Therefore, the boundaries must be provided as above described so that, when Y plus 1/16 should exceed the straight line $Z'_{k\cdot 7E\cdot 1}$ immediately thereabove, the $j$ corresponding to the exceeded point may be given. To realize this, it is necessary to provide the boundaries below the dotted lines 1408 to 1413 in FIG. 14.

For the reason above explained, the border lines for the selection of the partial quotient must be provided in the regions enclosed, respectively by $Z'_{k\cdot 7E\cdot 1}=¾$ and $Z'_{k\cdot 7E\cdot 1}=2/4$, $Z'_{k\cdot 7E\cdot 1}=2/4$ and $Z'_{k\cdot 7E\cdot 1}=¼$, $Z'_{k\cdot 7E\cdot 1}=2/4$ and $Z'_{k\cdot 7E\cdot 1}=-¾$, and also surrounded by dotted lines 1408 and 1401, 1409 and 1402, , 1413 and 1406, with hatchings. In drawing the border lines within the hatched regions, it is impossible to draw any such lines irrespective of the divisor $d$ being within the range of $½<d-1$, as shown in FIG. 9. Thus, in consideration of the more significant bits of the divisor $d$, along with the round figure Y, it is possible to provide, for example, the stepped border lines 1414 to 1419 as shown. While the border lines are exemplary of the lines for the four more significant bits including the sign bit of the divisor $d$, any other border lines may be provided only if they are drawn with the hatched regions. The points on the border lines are included in the ranges for giving the partial quotients $j$ for the more significant parts.

A decoding table may be compiled on the basis of the boundaries shown in FIG. 14, as shown in table 2.

In table 2, $f_2$ and $f_{\cdot 7E\cdot 2}$ indicate the upper or more significant bit when a partial quotient $j$ is expressed in two bits of a binary number, while $f_1$ and $f_{\cdot 7E\cdot 1}$ represent the lower bit. Also, $f_2$ and $f_1$ indicate that the partial quotient is positive and $f_{\cdot 7E\cdot 2}$ and $f_{\cdot 7E\cdot 1}$ indicate that the partial quotient is negative. Since the upper two bits of the divisor $d$ are constantly 01, the decoder may be constructed only in consideration of the third and fourth bits of the divisor $d$.

TABLE 2

| $\upsilon$ \ $d$ | 0100- | 0101- | 0110- | 0111- | Partial quotient signal | |
|---|---|---|---|---|---|---|
| 011— | | | | | $f_2=1$ | $f_1=1$ |
| 0101- | $j=\frac{3}{4}$ | | | | $f_{-2}-0$ | $f_{-1}=0$ |
| 01001 | | | | | | |
| 01000 | | | | | | |
| 00111 | | | $j=\frac{2}{4}$ | | $f_2=1$ | $f_1=0$ |
| 00110 | | | | | $f_{-2}=0$ | $f_{-1}=0$ |
| 00101 | | | | | | |
| 00100 | | | | | | |
| 00011 | | | | | $f_2=0$ | $f_1=1$ |
| 00010 | | $j=\frac{1}{4}$ | | | $f_{-2}=0$ | $f_{-1}=0$ |
| 00001 | | | | | | |
| 00000 | | | | | $f_2=0$ | $f_1=0$ |
| 11111 | | $j=0$ | | | $f_{-2}=0$ | $f_{-1}=0$ |
| 11110 | | | | | | |
| 11101 | | | | | | |
| 11100 | | $j=-\frac{1}{4}$ | | | $f_2=0$ | $f_1=0$ |
| 11011 | | | | | $f_{-2}=0$ | $f_{-1}=1$ |
| 11010 | | | | | | |
| 11001 | | | | | | |
| 11000 | | | $j=-\frac{2}{4}$ | | $f_2=0$ | $f_1=0$ |
| 10111 | | | | | $f_{-2}=1$ | $f_{-1}=0$ |
| 10110 | $j=-\frac{3}{4}$ | | | | $f_2=0$ | $f_1=0$ |
| 100— | | | | | $f_{-2}=1$ | $f_{-1}=1$ |

Figure 15:
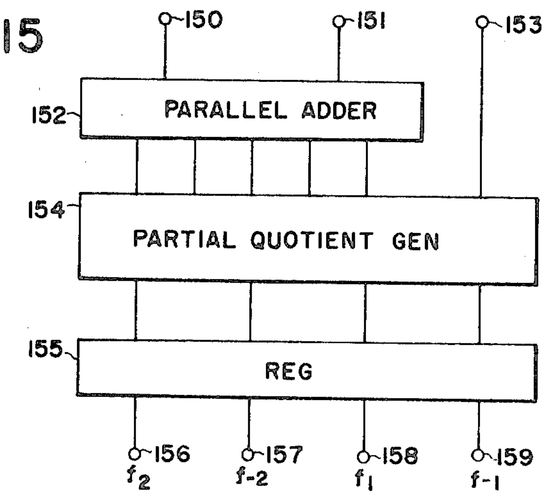
FIG. 15 is a diagram showing an exemplary form of the decoder.

FIG. 15 is a diagram showing an example of the decoder 1118 shown in FIG. 11. As already described, the decoder 1118 obtains the sum of the upper bits of sum and carry parts held by the registers 1116 and 1117 and the thus obtained sum is considered as the round figure Y for the partial remainder $y'_{k\cdot 7E'1}$. Therefore, the round figure Y together with the divisor $d$ makes it possible for the decoder to be constituted on the basis of the decoding table as shown in table 2. Thus, as shown in FIG. 15, the decoder consists of an adder 152 for finding the sums of several upper bits of the sum part $S_i$ and carry part $C_i$ applied on the terminals 150 and 151, a partial quotient generator 154 capable of producing a partial quotient on the basis of the decoding table 2 from the sum representing the round figure Y obtained by the adder 152 and from the upper bit of divisor from the register 1103 which is applied on the terminal 153, and a register 155 for holding the partial quotient. This register 155 is equivalent to the register 1119 of FIG. 11, and from its output terminals 156 to 159 the signals $f_2$, $f_{\cdot 7E'2}$, $f_1$ and $f_{\cdot 7E'1}$ which represent the respective bits of the partial quotient are obtained. Unlike the carry save adder, the adder 152 is of a conventional type as shown in FIGS. 1 and 2. For a high-operation speed, it is effective to use a high-speed adder capable of performing parallel addition.

FIG. 16 shows circuit diagrams exemplifying the decoder of FIG. 11 constructed on the basis of the decoding table shown in table 2. FIGS. 16*a* through 16*g* represent the adder 152 shown in FIG. 15, and FIGS. 16*h* through 16*l* represent the partial quotient generator 154 of FIG. 15.

Figure 16K:
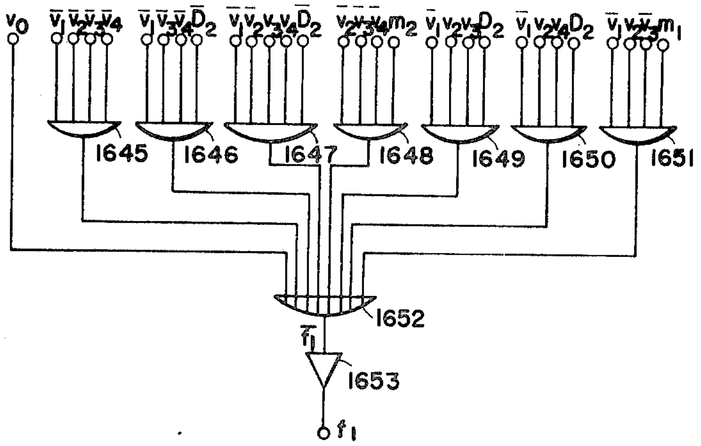
FIGS. 16*a* and 16*l* are diagrams of exemplary arrangements of a circuit for a decoder constructed on the basis of the decoding table prepared as shown in FIG. 14.
Figure 16L:
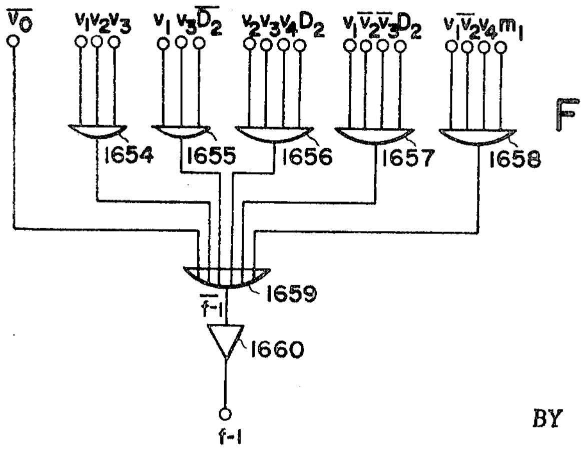
Figure 16A:
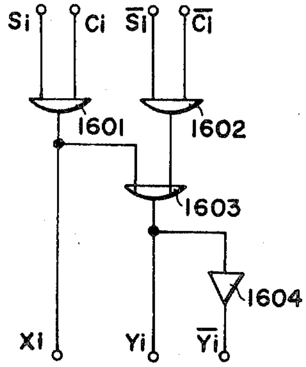

In FIG. 16*a* there is shown a circuit arrangement in which $X_i=S_i\cdot C_i$, $Y_i=S_i\cdot C_i+\overline{S_i\cdot C_i}$ and the inverted signal $\overline{Y_i}$ of $Y_i$ are obtained from the signals $S_i$ and $C_i$ held for each figure of the six more significant bits of the registers 1116 and 1117 shown in FIG. 11 and the inverted signals $S_i$ and $C_i$. AND-circuits 1601 and 1602 obtain the logical products of $S_i$ and $C_i$ and $S_i$ and $C_i$, and while using the output signal of the AND-circuit 1601 as $X_i$, the logical sum of the output signals of the AND-circuits 1601 and 1602 are taken by an OR-circuit 1603, thereby to obtain the signal $Y_i$. The signal $Y_i$ is inverted by an inverter 1604 to a signal $Y_i$.

Figure 16B:
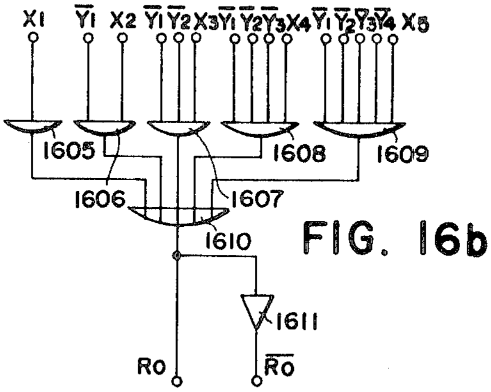
Figure 16C:
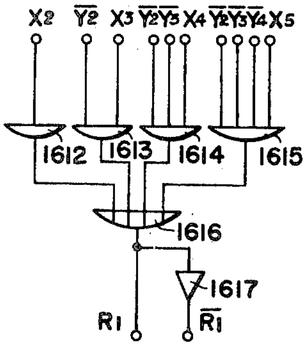
Figure 16D:
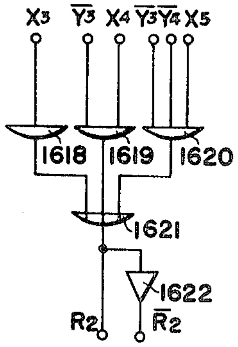
Figure 16E:
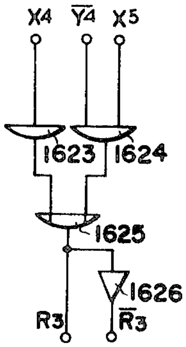
Figure 16F:
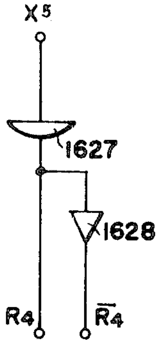

FIGS. 16*b* to 16*f* represent the respective carry generators for six-figure adder which use $X_i$, $Y_i$ and $Y_i$ ($i=0, 1, \quad 5$) as input signals. In FIG. 16*b* AND-circuits 1605 to 1609 take the logical products of $X_1$, ($Y_1$, $X_2$), ($Y_1$, $Y_2$, $X_3$), ($Y_1$, $Y_2$, $Y_3$, $X_4$) and ($Y_1$, $Y_2$, $Y_3$, $Y_4$, $X_5$), and the logical sum of the output signals of the AND-circuits 1605 to 1609 are taken by an OR-circuit 1610, whereby a carry $R_0$ for the first bit is obtained. In FIG. 16*c*, AND-circuits 1612 to 1615 take the logical products of $X_2$, ($Y_2$, $X_3$), ( $Y_2$, $Y_3$, $X_4$) and ($Y_2$, $Y_3$, $Y_4$, $X_5$) and the logical sum of their output signals is given by an OR-circuit 1616 to obtain a carry $R_1$. In FIG. 16*d* through 16*f* AND-circuits 1618 to 1620 obtain the logical products of $X_3$, ($Y_3$, $X_4$) and ( $Y_3$, $Y_4$, $X_5$) and the logical sum of the output signals of the AND-circuits 1618 to 1620 is obtained by an OR-circuit 1621 to get a carry $R_2$. AND-circuit 1623 and 1624 take the logical products of $X_4$ and ($Y_4$, $X_5$), and the logical sum of the output signals of the AND-circuits 1623 and 1624 is obtained by an OR-circuit 1625 thereby to get a carry $R_3$. By passing the signal $X_5$ through an AND-circuit 1627, a carry $R_4$ is obtained. Those carries $\overline{R_0}$ to $\overline{R_4}$ are passed through inverters 1611, 1617, 1622, 1626 and 1628 and are thereby inverted to signals $R_0$ to $R_4$. Since the input signals of the AND-circuits 1605, 1612, 1618, 1623 and 1627 are one input, they appear on the output terminals without undergoing any logical change. It is therefore possible to omit these AND circuits and apply these input signals $X_1$, $X_2$, $\quad X_4$ directly to the OR-circuits 1610, 1616, 1621 and 1625, and the inverter 1628.

Figure 16G:
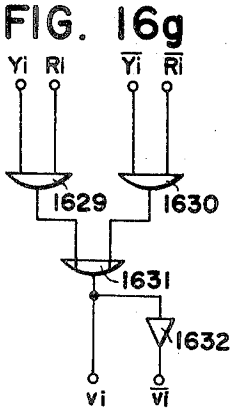

FIG. 16*g* shows the sum circuit for one figure of the six-figure adder 152. This circuit obtains the signal $Y_i$ for each figure of the round figure Y of the partial remainder from the signals $Y_i$, $\overline{Y_i}$ and $R_i$, $\overline{R_i}$ obtained by the circuits shown in FIG. 16 *a* through 16*f*. Thus, six such circuits for one figure each are combined to form a sum circuit for the adder. AND-circuits 1629 and 1630 obtain the logical products of $Y_i$, $R_i$ and $\overline{Y_i}$, $\overline{R_i}$, and an OR circuit obtains the output signals of the AND-circuits 1629 and 1630 thereby to get the signal $Y_i$. This signal $Y_i$ is inverted through an inverter 1632 to $\overline{Y_i}$. The inverters shown in FIGS. 16*a* through 16*g* may be omitted by employing OR-NOR circuits in lieu thereof, as pointed out above.

Figure 16H:
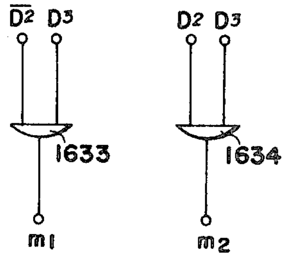

FIG. 16*h* shows a part of the partial quotient generator 154 of FIG. 15. From the signals $D_2$ and $D_3$ on the third and fourth bits from the most significant bit of the divisor signal $d$ held by the register 1103 of FIG. 11 and from the signals $\overline{D_2}$ obtained by inverting $D_2$, the logical products of $\overline{D_2}$, $D_3$ and $D_2$, $D_3$ are taken by AND-circuits 1633 and 1634, for use as $m_1$ and $m_2$, respectively. The signals $m_1$ and $m_2$ indicate that the upper four bits of the divisor $d$ become 0101 and 0111.

Figure 16J:
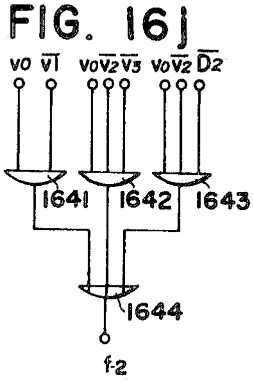
Figure 16I:
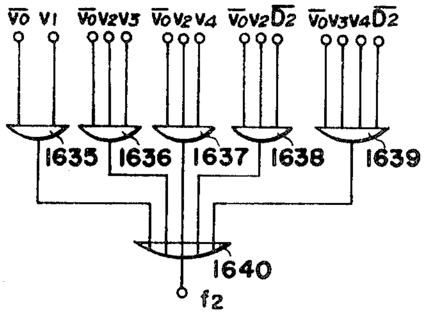

FIG. 16*i* shows a circuit for obtaining a signal $f_2$ which indicates that the upper bit of a partial quotient composed of two bits is +1. It indicates all of the combinations between the divisor $d$ and the round figures Y which fall within the ranges of $j$=¾ and $j$=2/4 on the decoding table given in table 2. The signals ($Y_0$, $Y_1$), ($Y_0$, $Y_2$, $Y_3$), ($Y_0$, $Y_2$, $Y_4$), ($Y_0$, $Y_2$, $D_2$) and ($Y_0$, $Y_3$, $Y_r$, $D_2$) are passed through AND-circuits 1635 to 1639 where their logical products are obtained, and the logical sum of the output signals of the AND-circuits 1635 to 1639 are obtained by an OR-circuit 1640, whereby the signal $f_2$ is obtained.

FIG. 16*j* shows a circuit for obtaining a signal $f_{\cdot 7E'2}$ which indicates that the upper bit of the partial quotient is −1. The logical products of input signals ($Y_0$, $\overline{Y_1}$), ($Y_0$, $\overline{Y_2}$, $\overline{Y_3}$), and ($Y_0$, $\overline{Y_2}$, $\overline{D_2}$) are obtained by AND-circuits 1641 to 1643, and the logical sum of the output signals of these AND circuits is obtained by an OR-circuit 1644, whereby the signal $f_{\cdot 7E'2}$ is obtained. Thus, it indicates all of the combinations of the divisor with the round figures Y which come within the ranges of $j$=−2/4 and $j$=−¾ of table 2.

In FIGS. 16*k* and 16*l* there are shown circuits for obtaining the signals $f_1$ and $f_{\cdot 7E'1}$ which indicate the lower bits of the respective partial quotients become +1 and −1. From all of the combinations of the divisor and round figures Y within the ranges of $j$=2/4, $j$=0 −¾ and $j$=¾ 0, $j$=−2/4 which are, respectively, $f_1$=0 and $f_{\cdot 7E'1}$=0 in table 2, the signals $\overline{f_1}$ and $\overline{f_{\cdot 7E'1}}$ are first obtained, and then the signals $f_1$ and $f_{\cdot 7E'1}$ are inverted, thereby to obtain the signals $f_1$ and $f_{\cdot 7E'1}$ in a converse way. In FIG. 16*k*, reference numerals 1645 to 1651 designate AND circuits which take the logical products of ($\overline{Y_1}$, $\overline{Y_2}$, $\overline{Y_3}$, $\overline{Y_4}$), ($\overline{Y_1}$, $\overline{Y_3}$, $\overline{Y_4}$, $\overline{D_2}$), ($\overline{Y_1}$, $\overline{Y_2}$, $Y_3$, $Y_4$, $\overline{D_2}$), ($\overline{Y_2}$, $\overline{Y_3}$, $\overline{Y_4}$, $m_2$), ($\overline{Y_1}$, $Y_2$, $Y_3$, $D_2$), ($\overline{Y_1}$, $Y_2$, $Y_4$, $D_2$) and ($\overline{Y_1}$, $Y_2$, $\overline{Y_3}$, $m_1$). As the logical sum of the output signals of the AND-circuits 1645 to 1651 and the signal $Y_0$ is obtained by an OR-circuit 1652, the signal $\overline{f_1}$ results. Accordingly, by passing the signal $f_1$ through an inverter 1653, the signal $f_1$ can be obtained. In FIG. 16*l*, the logical products of input signals ($Y_1$, $Y_2$, $Y_3$), ($Y_1$, $Y_3$, $D_2$), ($Y_2$, $Y_3$, $Y_4$, $D_2$), ($Y_1$, $Y_2$, $Y_3$, $D_2$) and ($Y_1$, $Y_2$, $Y_4$, $m_1$) and taken by AND-circuits 1654 to 1658, and the output signals of these AND-circuits 1654 to 1658 and the input signal $Y_0$ are passed through an OR-circuit 1659 where the logical sum thereof is taken to obtain the signal $\overline{f}_{7E'1}$. This signal $f_{7E'1}$ is further passed through an inverter 1660 to obtain the signal $\overline{f}_{7E'1}$.

Through FIGS. 11 to 16 there has been illustrated a form of divider according to the invention in which partial quotients for plural figures of a binary number are given, specifically in conjunction with an embodiment adapted to give a partial quotient representing two figures of a binary number. Entirely the same construction is applicable as well to the dividers for giving partial quotients for *n* figures of a binary number. For example, in FIG. 11, it is possible to provide the carry save adders in *n*-stages, and pairs of gate circuits corresponding to said carry save adders. The partial remainder signals held by the registers 1116 and 1117 are shifted leftward by *n*-bits and are transferred to the registers 1101 and 1102. A decoder equivalent to the decoder 1118 is constructed on the basis of the decoding table made by the procedure as already described in connection with FIG. 14 from the plural upper bits of the registers 1116, 1117 and 1103. Also, the divider may be so constructed that 2*n* signals are obtained as the partial quotient signals, which can be held by the shift registers 1124 and 1127 in separate groups of *n*-signals indicating positive and negative features, respectively. With such arrangement it should be obvious that the divider can perform parallel division of *n*-figures.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

I claim:

1. A high-speed divider for performing a division operation between a dividend signal and a divisor signal comprising:

first register means including a first and a second register for holding sum and carry signal representative of a partial remainder, respectively, means for initially supplying said dividend signal and a zero signal as the sum and carry signals in said first and second registers, respectively;

decoder means for calculating a round figure of the partial remainder from the upper parts of predetermined figures of sum and carry signals held in said first and second registers, thereby producing a partial quotient consisting of either of three different signals indicating 1, 0, and −1;

selecting means for selectively producing either one of three different signals in the form of the divisor signal, zero and the complement of the divisor signal in response to the three different signals from said decoder means indicating −1, 0 and 1, respectively;

shifting means for shifting upwards the sum and carry signals held in the first and second registers by one figure, including holding means for holding the shifted sum and carry signals, respectively;

carry save adder means for adding the shifted sum and carry signals supplied from said shifting and holding means with the selected signal supplied from said selecting means to produce new sum and carry signals representative of a new partial remainder, and operatively replacing the partial remainder previously held in the first register means with the new partial remainder so that said first register means, decoder means, selecting means, shifting and holding means and carry save adder means may repeat their operations in accordance with subsequently renewed partial remainders; and second register means for holding partial quotients sequentially obtained from said decoder means thereby obtaining a quotient from the sequentially held partial quotients.

2. A high-speed divider according to claim 1, wherein said second register means comprises means for holding in succession the sequence of occurrences of such partial quotient indicating 1 and means for holding in succession the sequence of occurrences of such partial quotient indicating −1.

3. A high-speed divider for performing a division operation between a dividend signal and a divisor signal comprising:

first register means including a first and a second register for holding sum and carry signals representative of a partial remainder, respectively;

means for initially supplying said dividend signal and a zero signal as sum and carry signals in the first and second registers, respectively;

decoder means for producing a partial quotient consisting of a plurality of figures, each figure of the partial quotient consisting of either of three different signals indicating 1, 0 and −1 in response to both the upper parts of predetermined figures of sum and carry signals representative of a partial remainder held in said first and second registers and the upper parts of predetermined figures of said divisor;

selecting means having a plurality of gate means provided to correspond to respective figures of the partial quotient, each selectively producing either one of three different signals in the form of the divisor signal, zero and complement of the divisor signal in response to the indications of −1, 0 and 1 of the corresponding figure of partial quotient, respectively, from said decoder means;

shifting means for shifting upwards the sum and carry signals held in the first and second registers by the same number of figures as that of the figures of the partial quotient, including holding means for holding the shifted sum and carry signals, respectively;

a plurality of carry save adders of the same number as that of the figures of the partial quotient connected in cascade and provided to correspond to said gate means, one of which operatingly adds the shifted sum and carry signals supplied from said shifting and holding means with a selected signal supplied from said gate means corresponding to the higher figure of the partial quotient to produce new sum and carry signals and the other of which operatingly adds said new sum and carry signals supplied from the first mentioned one of the adders with a selected signal supplied from said gate means corresponding to the lower figure of the partial quotient to produce the other new sum and carry signals representative of a new partial remainder and operatively replaces the previous partial remainder in the first register means with the new partial remainder, so that said first register means, decoder means, selecting means, shifting and holding means and plural carry save adders may repeat their operations in accordance with subsequently renewed partial remainder; and second register means for holding partial quotients sequentially obtained from said decoder means; thereby obtaining a quotient from the sequentially held partial quotients.

4. A high-speed divider according to claim 3, wherein said decoder means comprises means connected to said first and second registers for adding the upper parts of said sum and carry signals to each other and means for generating a partial quotient of at least two figures from the output of said adding means and upper part of predetermined figures of said divisor.

* * * * *